(12) United States Patent
Nomura

(10) Patent No.: US 12,744,989 B2
(45) Date of Patent: Sep. 22, 2026

(54) INFORMATION PROCESSING APPARATUS, INFORMATION PROCESSING METHOD, PROGRAM, AND INFORMATION PROCESSING SYSTEM

(71) Applicant: Sony Group Corporation, Tokyo (JP)

(72) Inventor: Naoki Nomura, Kanagawa (JP)

(73) Assignee: Sony Group Corporation, Tokyo (JP)

( * ) Notice: Subject to any disclaimer, the term of this patent is extended or adjusted under 35 U.S.C. 154(b) by 297 days.

(21) Appl. No.: 18/687,939

(22) PCT Filed: Oct. 11, 2022

(86) PCT No.: PCT/JP2022/037905

§ 371 (c)(1),
(2) Date: Feb. 29, 2024

(87) PCT Pub. No.: WO2023/074355

PCT Pub. Date: May 4, 2023

(65) Prior Publication Data

US 2024/0380967 A1 Nov. 14, 2024

(30) Foreign Application Priority Data

Oct. 25, 2021 (JP) ................................ 2021-173689

(51) Int. Cl.
*H04N 23/611* (2023.01)
*G06V 40/20* (2022.01)
*H04N 23/60* (2023.01)

(52) U.S. Cl.
CPC ........... *H04N 23/611* (2023.01); *G06V 40/20* (2022.01); *H04N 23/64* (2023.01)

(58) Field of Classification Search
CPC ...... H04N 23/611; H04N 23/64; H04N 5/222; H04N 5/77; H04N 23/60; G06V 40/20
(Continued)

(56) References Cited

U.S. PATENT DOCUMENTS

2009/0219291 A1* 9/2009 Lloyd ..................... G06T 15/20 345/427
2016/0182591 A1* 6/2016 Sienel ................... H04L 65/765 709/204

(Continued)

FOREIGN PATENT DOCUMENTS

JP 2008078713 A 4/2008
JP 2010011409 A 1/2010

(Continued)

OTHER PUBLICATIONS

International Search Report (PCT/ISA/210), International Application No. PCT/JP2022/037905, dated Dec. 20, 2022.

*Primary Examiner* — Ali Bayat
(74) *Attorney, Agent, or Firm* — Michael Best & Friedrich LLP

(57) ABSTRACT

Information processing that accommodates video content production that maintains content quality and automatically determines composition in a camera video or the like is disclosed. In one example, an information processing apparatus includes a video controller that generates a virtual camera video to be used for an output video on the basis of a captured video by a camera, and performs composition update control of the virtual camera video on the basis of determination information regarding a subject in the captured video or the output video.

16 Claims, 13 Drawing Sheets

(58) Field of Classification Search
USPC .......................................................... 382/103
See application file for complete search history.

(56) References Cited

U.S. PATENT DOCUMENTS

| | | | | |
|---|---|---|---|---|
| 2017/0295446 | A1* | 10/2017 | Thagadur Shivappa . | G06F 3/16 |
| 2018/0167553 | A1* | 6/2018 | Yee ....................... | G06T 15/205 |
| 2019/0156579 | A1* | 5/2019 | Sheftel ................... | H04N 7/185 |
| 2019/0287302 | A1* | 9/2019 | Bhuruth .............. | G06F 3/04847 |
| 2020/0084426 | A1* | 3/2020 | Maruyama ............. | H04N 5/268 |
| 2024/0053611 | A1* | 2/2024 | Lutter ................ | G02B 27/0172 |

FOREIGN PATENT DOCUMENTS

| | | | |
|---|---|---|---|
| JP | 2011082660 | A | 4/2011 |
| JP | 2017123540 | A | 7/2017 |
| JP | 2020025248 | A | 2/2020 |
| WO | 2020189058 | A1 | 9/2020 |

* cited by examiner

1
SERVER DEVICE
5
5
3
OPERATION TERMINAL
4
2C
2A
2B
2

Figure 6:
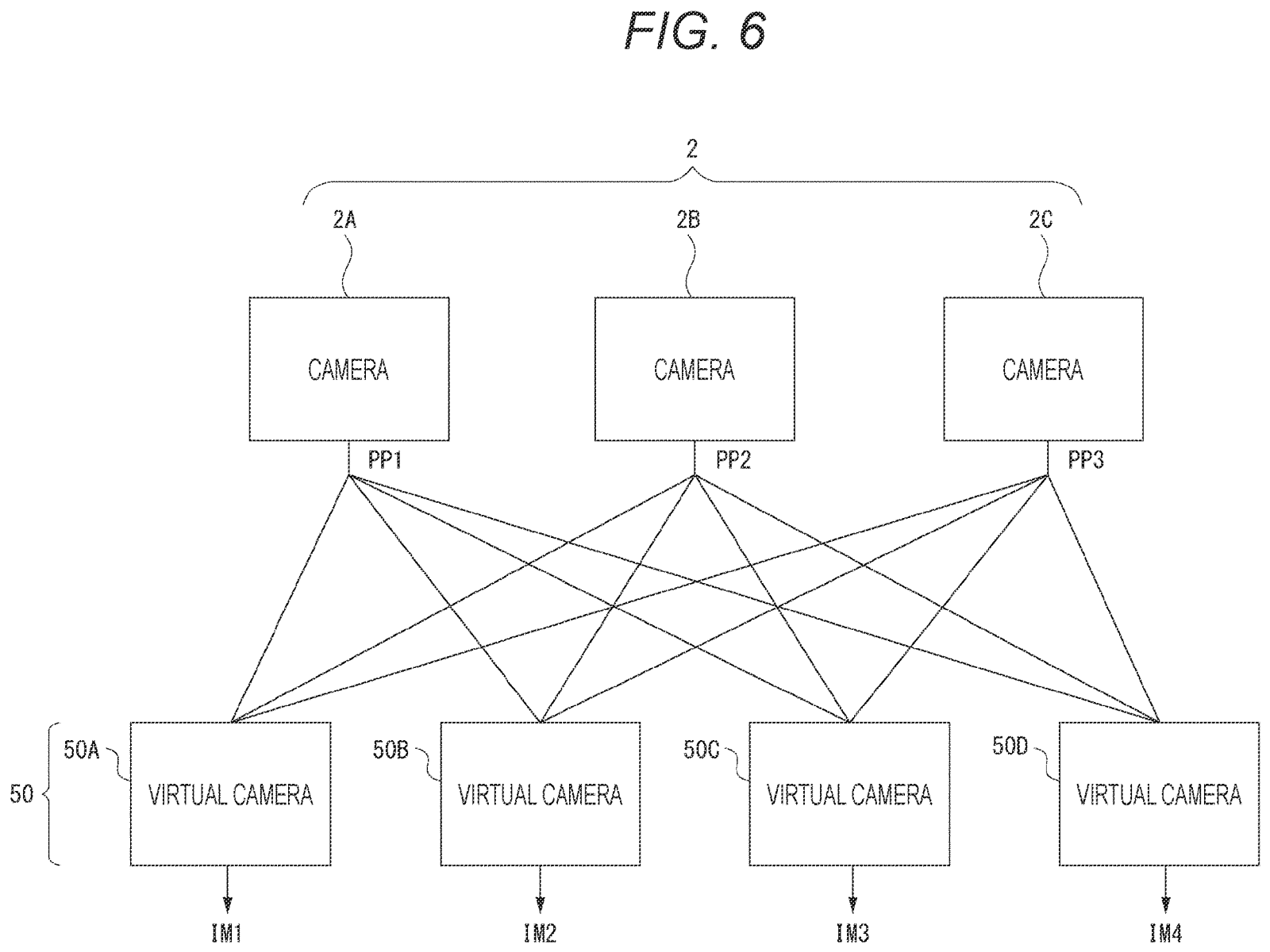

2A CAMERA PP1

2B CAMERA PP2

2C CAMERA PP3

50A VIRTUAL CAMERA IM1

50B VIRTUAL CAMERA IM2

50C VIRTUAL CAMERA IM3

50D VIRTUAL CAMERA IM4

50

2
2A
2B
2C
CAMERA
CAMERA
CAMERA
PP1
PP2
PP3
VIRTUAL CAMERA
VIRTUAL CAMERA
VIRTUAL CAMERA
50A
50B
50C
50
IM1
IM2
IM3

2
2A
2B
2C
CAMERA
CAMERA
CAMERA
PP1
PP2
PP3
VIRTUAL CAMERA
VIRTUAL CAMERA
VIRTUAL CAMERA
VIRTUAL CAMERA
50A
50B
50C
50D
50
IM1
IM2
IM3
IM4

63
66
64
62
IM4
IM3
IM2
IM1
65
PP3
PP2
PP1
61
60

A
CT
tm1
tm2
tm3
tm4
tm5
IM2
IM4
IM2
IM3
B
CT
tc1
tc2
tc3
tc4
IM1

INFORMATION PROCESSING APPARATUS, INFORMATION PROCESSING METHOD, PROGRAM, AND INFORMATION PROCESSING SYSTEM

TECHNICAL FIELD

The present technology relates to an information processing apparatus, an information processing method, a program, and an information processing system, and for example, relates to a technology suitable for the field of video production.

BACKGROUND ART

Patent Document 1 below discloses a technique for determining main and sub imaging devices by using information regarding subject designation by a user, information regarding subject detection, manual operation information of an imaging lens by a user, and the like when a plurality of imaging devices is linked.

CITATION LIST

Patent Document

Patent Document 1: Japanese Patent Application Laid-Open No. 2020-025248

SUMMARY OF THE INVENTION

Problems to be Solved by the Invention

In a case where it is considered that an event or the like is captured using one or a plurality of cameras and video content is produced, for example, it is desired to automatically determine a composition of a camera or the like to save labor.

However, when the composition determination of the camera, the switching of the camera, and the like are automatically and randomly performed, all the subjects appear at the same ratio in the output video content, which is unnatural. For example, taking a video content of a wedding as an example, if the ratio of the bride, the groom, the family, the relatives, the guests, the friends, and the like is the same, as a result, the video has an impression that the bride or the groom as the main characters is not shown much. In addition, a scene to be noted may not be shown in the event. For example, an irrelevant person is shown during speech or the like.

Even if designated subjects are automatically captured by a plurality of cameras as in Patent Document 1, it is difficult to appropriately capture a plurality of subjects according to the situation.

Therefore, in the present disclosure, composition determination and the like are automatically performed. A technology for producing video content with high content quality is proposed.

Solutions to Problems

An information processing apparatus according to the present technology includes a video control unit that generates a virtual camera video to be used for an output video on the basis of a captured video by a camera, and performs composition update control of the virtual camera video on the basis of determination information regarding a subject in the captured video or the output video.

One or a plurality of virtual camera videos is generated on the basis of an actual captured video by the camera. Then, using the virtual camera videos, for example, an output video serving as video content to be distributed, broadcast, recorded, or the like is generated. In this case, the composition update control of the virtual camera videos is automatically performed.

BRIEF DESCRIPTION OF DRAWINGS

FIG. 4 is an explanatory diagram of a relationship between physical camera videos and virtual camera videos and each function of the information processing apparatus according to the embodiment.

FIG. 6 is an explanatory diagram of a correspondence relationship between virtual cameras and physical cameras according to the embodiment.

MODE FOR CARRYING OUT THE INVENTION

Hereinafter, an embodiment will be described in the following order.

1. <System Configuration>

<2. Configuration of Information Processing Apparatus>

<3. Physical Camera Video and Virtual Camera Video>

<4. User Interface>

<5. Video Production Processing>

<6. Summary and Modification Examples>

1. SYSTEM CONFIGURATION

In the embodiment, for example, a case where video content is produced on the basis of a captured video captured by one or a plurality of cameras in events such as a wedding, a reception, a party, sports, music, and a play, and other various events will be described as an example.

The produced video content may be distributed as live distribution or the like or may be broadcasted. In addition, it may be recorded in a recording medium for later distribution or the like, or may be transmitted to another device for some processing. Such distribution, broadcasting, recording, transmission, and the like are referred to as outputting of video content.

Figure 1:
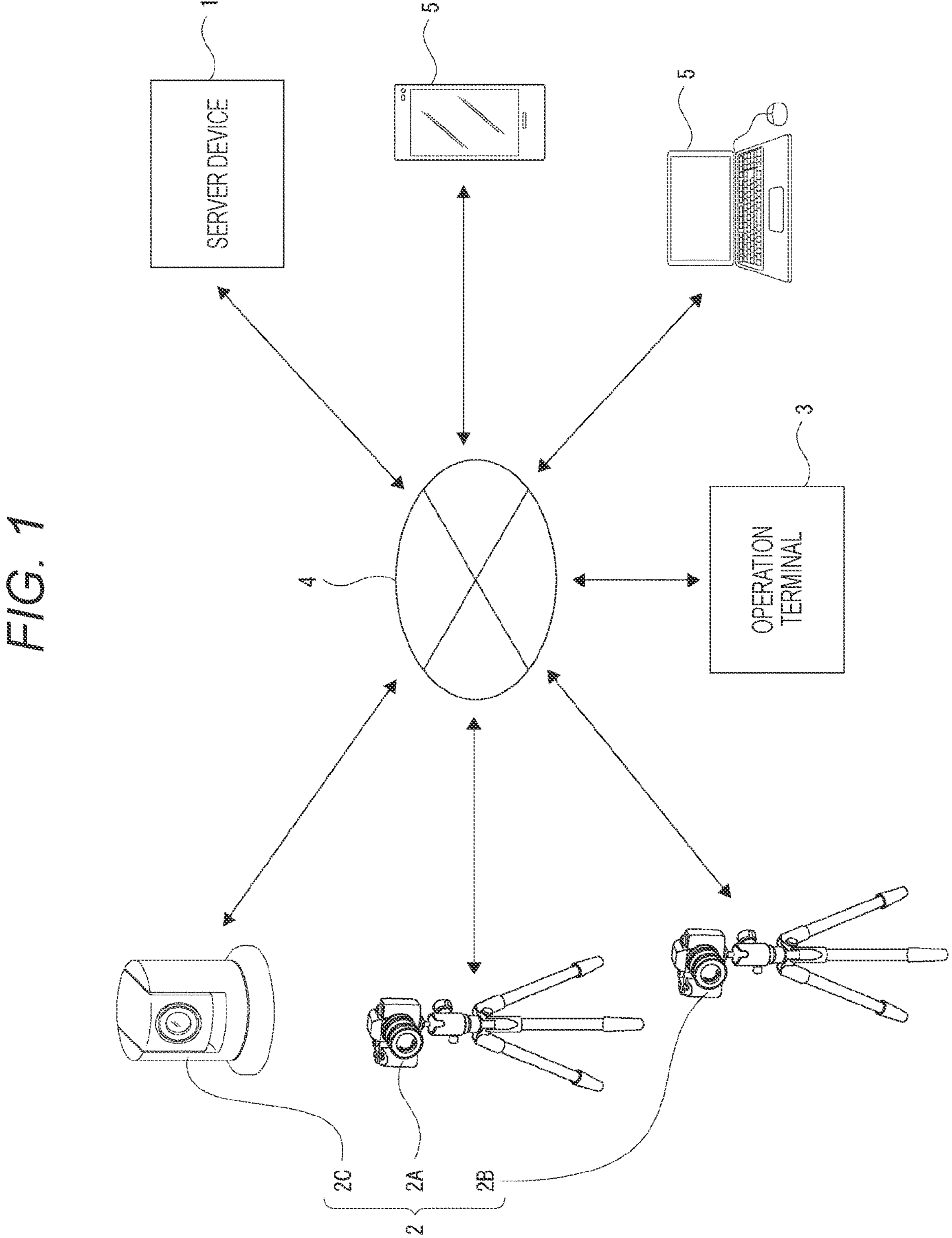
FIG. 1 is an explanatory diagram of a system configuration according to an embodiment of the present technology.

FIG. 1 illustrates an example of a system for video production and distribution including a server device 1 functioning as an information processing apparatus according to an embodiment. Here, the server device 1, a camera 2, an operation terminal 3, and a distribution destination terminal 5 are illustrated.

As the camera 2, a plurality of cameras 2A, 2B, and 2C is illustrated. These cameras 2A, 2B, and 2C are fixedly arranged by a tripod in, for example, an event venue or the like, or are installed at predetermined places. In the drawing, the cameras 2A and 2B are fixedly arranged by a tripod. A user such as a video production staff can manually change the positions of the cameras 2A and 2B or change the imaging direction, but does not necessarily have to do such a thing. In addition, the cameras 2A and 2B may be capable of changing the angle of view being captured by performing a zoom operation by a user operation, a remote operation, or the like.

In addition, the camera 2C is a camera capable of so-called swing control. The camera 2C can change the imaging direction by panning or tilting, for example, autonomously or by a remote operation or the like, or can change the angle of view being captured by performing a zoom operation autonomously or by a remote operation or the like.

The camera 2C may be capable of performing so-called automatic tracking shooting in which shooting is performed by automatically panning and tilting a specific person or the like as a target.

Note that the camera 2 used in the system of the embodiment is not limited to the cameras 2A, 2B, and 2C as described above, and may be a fixed point camera fixedly installed in an event venue, a camera carried by a user to capture an image, or the like.

The "camera 2" described in the description collectively refers to the cameras 2A, 2B, and 2C and various other cameras.

The camera 2 can communicate with the server device 1 via the network 4.

The server device 1 is an information processing apparatus that performs processing for video content production in the present embodiment.

The server device 1 may be realized by, for example, a computer device such as a personal computer, a tablet, or a smartphone used by a user (video production staff) in an event venue or the like, or may be realized by a computer device disposed at a position away from the event venue. Furthermore, a cloud server provided as a so-called cloud computing service may be used by a video production staff.

The operation terminal 3 is realized by, for example, a computer device such as a personal computer, a tablet, or a smartphone used by a user as a video production staff. In the case of the present embodiment, the operation terminal 3 is illustrated as a device mainly used for a user interface (hereinafter referred to as "UI") for video content production and output.

Note that the operation terminal 3 and the server device 1 may be realized by an integrated computer device.

As the distribution destination terminal 5, a personal computer, a smartphone, or the like is illustrated. These distribution destination terminals 5 mean devices to which video content produced by the present system is distributed. The general user can view the video content produced by imaging at the event venue by the distribution destination terminal 5.

As the network 4, for example, the Internet, a home network, a local area network (LAN), a satellite communication network, a telephone line, a fifth generation mobile communication system (5G) network, and other various networks are assumed.

The camera 2 transmits the captured video data to the server device 1 via the network 4. In addition, the server device 1 can transmit data for imaging operation control to the camera 2.

In addition, the server device 1 transmits and receives data for the UI to and from the operation terminal 3 via the network 4.

In addition, the server device 1 can distribute the produced video content to the distribution destination terminal 5 via the network 4.

Note that communication between these devices is not limited to network communication. For example, it is sufficient that images and data can be transferred between the camera 2 and the server device 1 or between the operation terminal 3 and the server device 1 by any communication method. For example, information communication may be enabled between devices by short-range wireless communication such as Bluetooth (registered trademark), wireless fidelity (Wi-Fi: registered trademark), or near field communication (NFC: registered trademark), infrared communication, or the like. Furthermore, the devices may be connected by a cable in a wired manner so as to be communicable.

In the above configuration, at least one or a plurality of cameras 2 is arranged in a venue of an event or the like.

The server device 1 may be at a site such as an event venue or may be at a remote place.

The operation terminal 3 may be operated by a production staff at a site such as an event venue, or may be at a remote place.

The distribution destination terminal 5 is used at an arbitrary place by the user.

In the configuration of FIG. 1, components of the video production system are at least the server device 1 and the camera 2. This is because a configuration in which the operation terminal 3 is not used is also conceivable. Of course, it can also be considered that a video production system is configured as the server device 1, the camera 2, and the operation terminal 3.

2. CONFIGURATION OF INFORMATION PROCESSING APPARATUS

Figure 2:
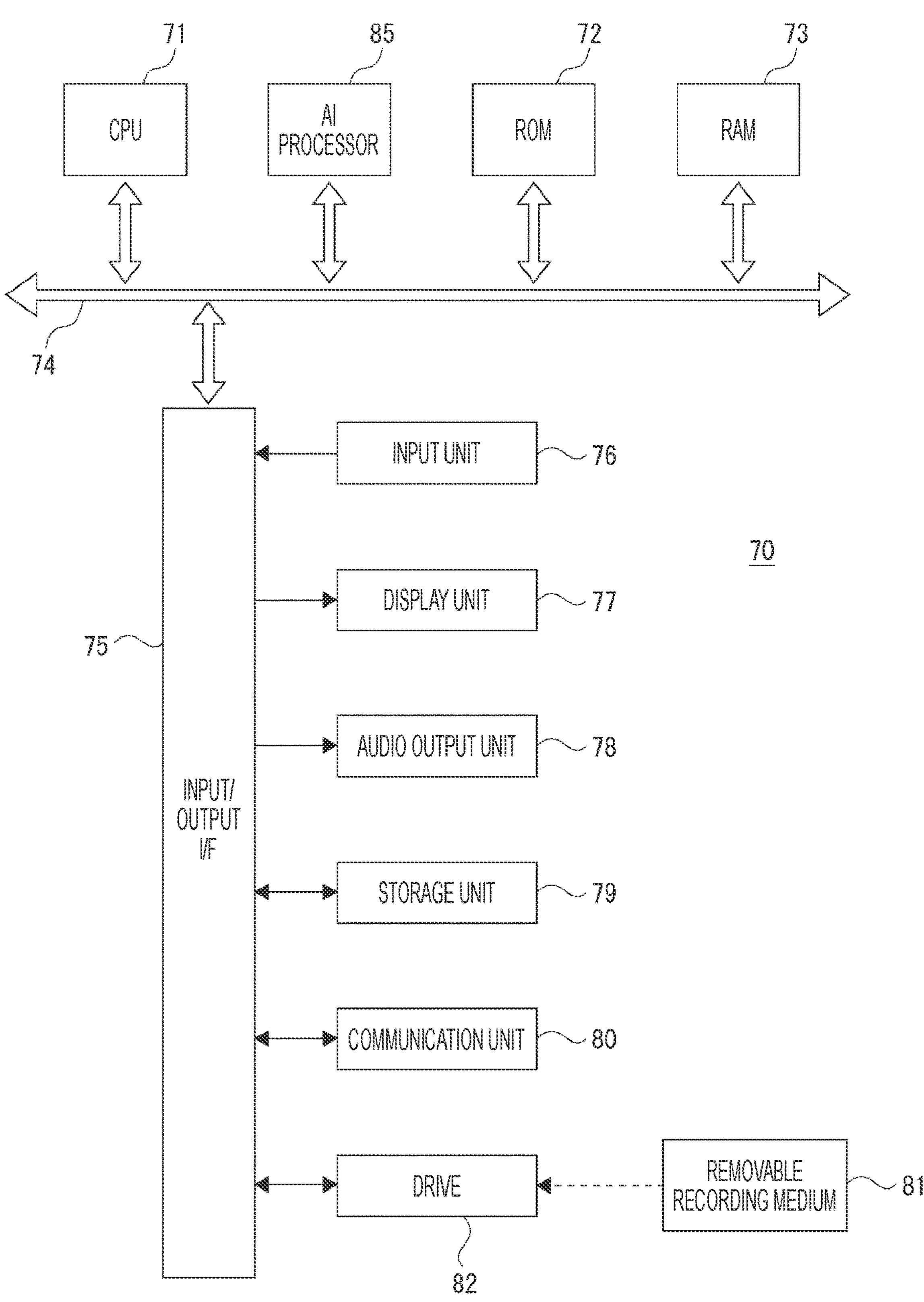
FIG. 2 is a block diagram of a hardware configuration of an information processing apparatus according to the embodiment.

FIG. 2 illustrates a configuration example of an information processing apparatus 70 that can be configured as the server device 1 or the operation terminal 3. The server device 1 and the operation terminal 3 can execute processing to be described later by having the following configuration of the information processing apparatus 70. The camera 2 can also have such a configuration of the information processing apparatus 70.

A central processing unit (CPU) 71 of the information processing apparatus 70 executes various processes in accordance with a program stored in a read only memory (ROM) 72 or a program loaded from a storage unit 79 into a random access memory (RAM) 73. The RAM 73 also appropriately stores data and the like necessary for the CPU 71 to execute the various processes.

The information processing apparatus 70 may include, for example, an artificial intelligence (AI) processor 85. As a result, advanced determination processing and recognition processing can be performed.

For example, in a case where the information processing apparatus 70 is the server device 1, the AI processor 85 executes extraction of a person who is a subject in a video, face recognition, personal identification, and the like. In addition, it is also possible to perform various types of determination processing regarding the detected individual person, and processing such as selection of a subject to be captured and composition setting based on the determination processing.

Note that the information processing apparatus 70 may further include a graphics processing unit (GPU), a general-purpose computing on graphics processing units (GPGPU), or the like.

The CPU 71, the ROM 72, the RAM 73, and the AI processor 85 are connected to one another via a bus 74. Furthermore, an input/output interface 75 is also connected to the bus 74.

An input unit 76 including an operator and an operation device is connected to the input/output interface 75.

For example, as the input unit 76, various types of operators and operation devices are assumed, such as a keyboard, a mouse, a key, a dial, a touch panel, a touch pad, a remote controller, and the like.

A user operation is detected by the input unit 76, and a signal corresponding to the input operation is interpreted by the CPU 71.

In addition, a display unit 77 including a liquid crystal display (LCD) panel, an organic electro-luminescence (EL) display, or the like, and an audio output unit 78 including a speaker or the like are integrally or separately connected to the input/output interface 75.

The display unit 77 is a display unit that performs various displays, and includes, for example, a display device provided in a housing of the information processing apparatus 70, a separate display device connected to the information processing apparatus 70, and the like.

The display unit 77 executes display of an image for various types of image processing, an image to be processed, and the like on a display screen on the basis of an instruction from the CPU 71. Furthermore, the display unit 77 executes display of various operation menus, icons, messages, and the like, that is, display as a graphical user interface (GUI), on the basis of the instruction from the CPU 71.

The input/output interface 75 may be connected with the storage unit 79 including a hard disk, a solid-state memory, or the like, and a communication unit 80 that performs communication using various communication methods.

The storage unit 79 is used to store video data, management data, and the like. Various programs are stored in the storage unit 79.

In a case where the information processing apparatus 70 is considered as the server device 1, the storage unit 79 can be considered as a recording medium that records the produced video content.

The communication unit 80 performs communication processing via a transmission path such as the Internet, performs wired/wireless communication with various devices, and performs communication based on bus communication and the like.

In a case where the information processing apparatus 70 is considered as the server device 1, the communication unit 80 has functions for network communication and inter-device communication with the camera 2 and the operation terminal 3. Furthermore, the communication unit 80 may have a function of distributing and outputting the video content to the distribution destination terminal 5.

In a case where the information processing apparatus 70 is considered as the operation terminal 3, the communication unit 80 has functions for network communication and inter-device communication with the server device 1.

Furthermore, a drive 82 is also connected to the input/output interface 75 as necessary, and a removable recording medium 81 such as a magnetic disk, an optical disk, a magneto-optical disk, or a semiconductor memory is appropriately mounted.

By the drive 82, video and other various data files, various computer programs, and the like can be read from the removable recording medium 81. The read data file is stored in the storage unit 79, and an image and audio included in the data file are output by the display unit 77 and the audio output unit 78. Furthermore, the computer programs or the like read from the removable recording medium 81 are installed in the storage unit 79, as necessary.

In the information processing apparatus 70, for example, software for processing of the present disclosure can be installed via network communication by the communication unit 80 or the removable recording medium 81. Alternatively, the software may be stored in advance in the ROM 72, the storage unit 79 and the like.

Figure 3:
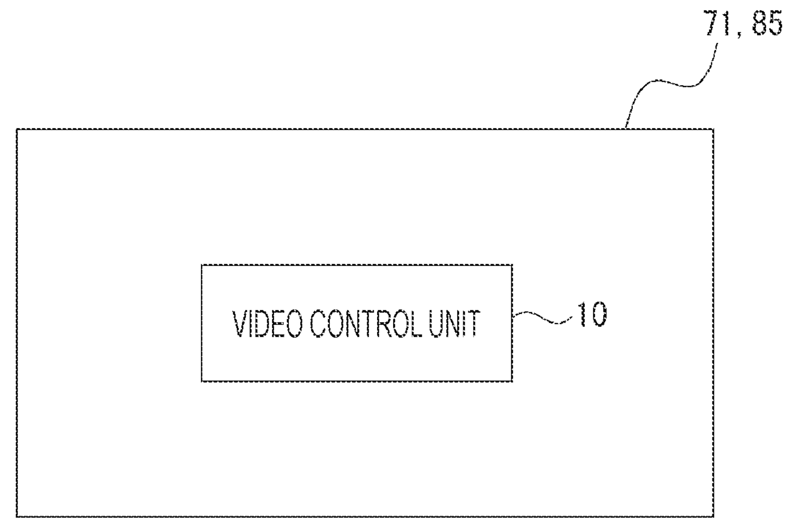
FIG. 3 is an explanatory diagram of a functional configuration of the information processing apparatus according to the embodiment.
Figure 3:
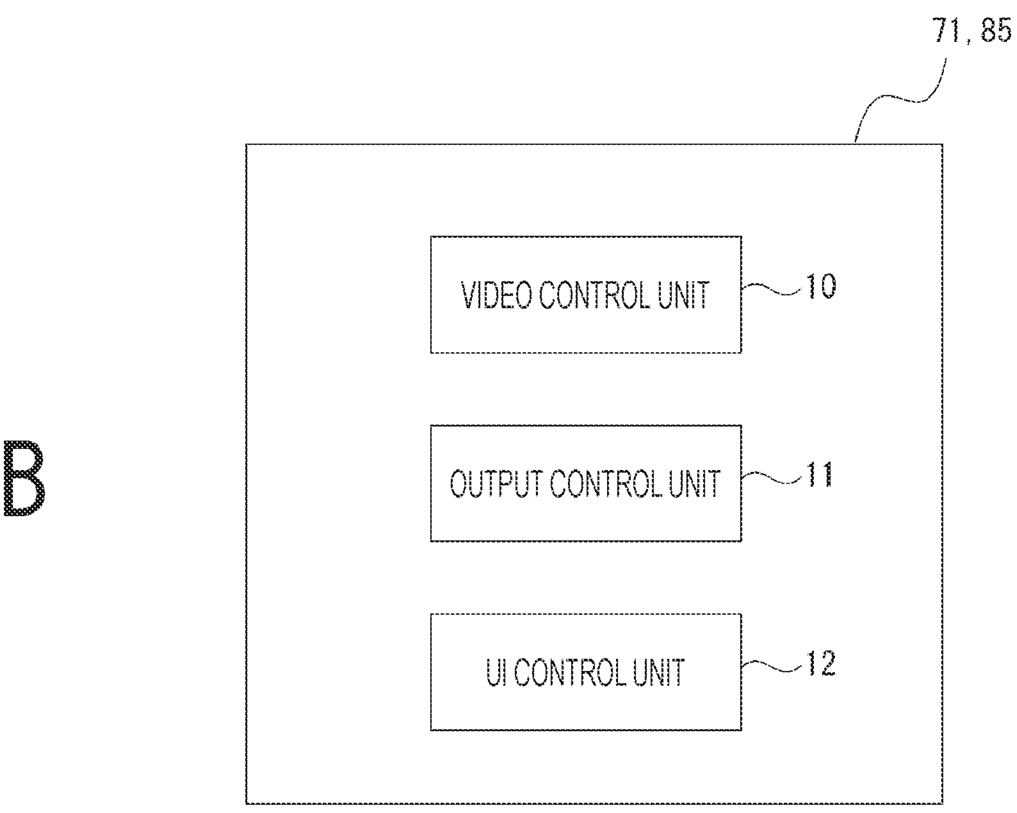

In a case where the server device 1 is assumed as the information processing apparatus 70, in the information processing apparatus 70, a functional configuration as illustrated in FIG. 3A or 3B is constructed as a function realized by the CPU 71, the AI processor 85, or cooperation thereof by the application program.

FIG. 3A illustrates a video control unit 10.

The video control unit 10 is a function of generating the virtual camera video to be used for the distribution video to be output on the basis of the video captured by the camera 2 and performing composition update control of the virtual camera video on the basis of the determination information regarding the subject in the captured video or the distribution video.

Although the virtual camera video will be described later, the function of the video control unit 10 executes video production processing in FIG. 11 described later. The server device 1 according to the embodiment has at least a function as the video control unit 10.

FIG. 3B illustrates the video control unit 10, an output control unit 11, and a UI control unit 12.

The output control unit 11 is a function of performing output processing of the produced video content. For example, the output control unit 11 performs processing of distributing video content.

Therefore, it is also possible to perform control to automatically switch the virtual camera video to be the output video (the video of the video content to be output) among the plurality of virtual camera videos.

Note that the output control unit 11 may perform processing of recording the produced video content on a recording medium as the output processing. For example, it is recorded for later distribution or the like. The recording destination may be a recording medium in the storage unit 79 or another recording device.

Furthermore, in the embodiment, the description will be given assuming that the server device 1 performs network distribution of the video content, but for example, broadcasting may be performed as output processing of the produced video content. For example, it is conceivable to output video content as television broadcasting.

The UI control unit 12 is a function of performing UI control by the operation terminal 3.

Figure 9:
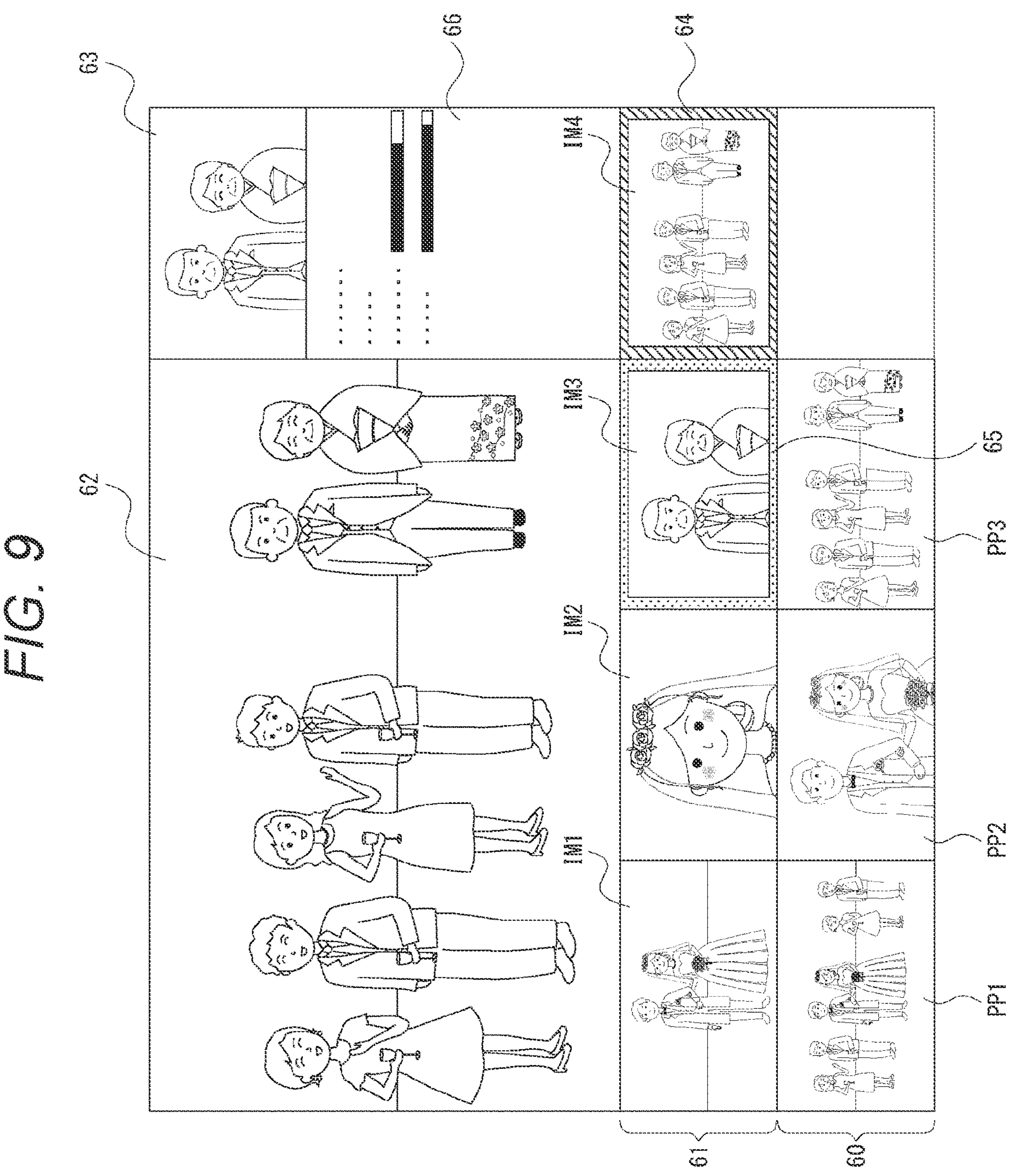
FIG. 9 is an explanatory diagram of a display example of a user interface screen according to the embodiment.

The UI control unit 12 performs processing of causing the operation terminal 3 to display a UI video as illustrated in FIG. 9 to be described later. This performs control to display the captured video by the camera 2 and the virtual camera video. In addition, processing of detecting a user's operation is also performed. For example, processing of displaying a plurality of virtual camera videos as UI videos and receiving a selection operation of the user for the displayed virtual camera videos is performed.

3. PHYSICAL CAMERA VIDEO AND VIRTUAL CAMERA VIDEO

In the video production system described with reference to FIG. 1, the server device 1 produces video content by using a video captured by the camera 2. Then, output processing such as distribution, broadcasting, and recording of the video content is performed.

In this case, as processing for producing the video content, the virtual camera video is generated, and composition update control for causing a change in the virtual camera video is performed on the basis of the determination information regarding the subject. This will be described.

Hereinafter, distribution is performed as output processing of the video content, and the video content as the output video is referred to as "distribution video CT".

The videos of the plurality of cameras 2 are used to produce the distribution video CT, and the captured videos captured by the cameras 2, that is, the cameras 2A, 2B, 2C, and the like in this case are referred to as "physical camera videos PP".

The above-described virtual camera video is a video generated by the video control unit 10 on the basis of the physical camera video PP, that is, a video that is a candidate for the distribution video CT. Hereinafter, it is referred to as a "virtual camera video IM".

In the present embodiment, the video control unit 10 generates a plurality of virtual camera videos IM, and the output control unit 11 selects the virtual camera videos IM automatically or according to manual operation. The virtual camera video IM selected at each time point constitutes the distribution video CT.

A relationship among the physical camera video PP, the virtual camera video IM, and the distribution video CT will be described with reference to FIG. 4.

Figure 4:
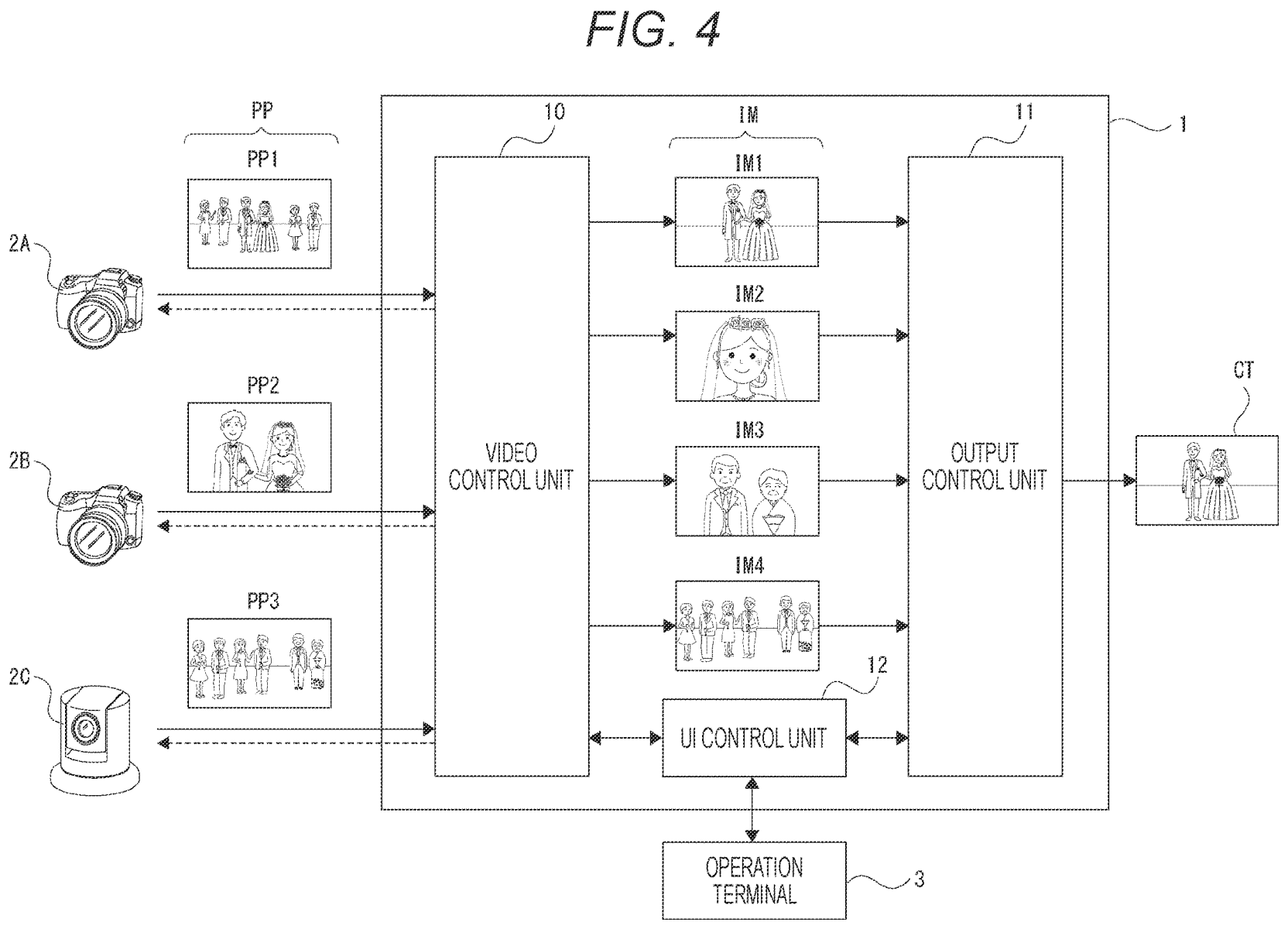

FIG. 4 illustrates physical camera videos PP1, PP2, and PP3 captured by the cameras 2A, 2B, and 2C. In an event venue or the like, the cameras 2A, 2B, and 2C continuously capture moving images during the event, for example, and transmit the physical camera videos PP1, PP2, and PP3 as moving images to the server device 1.

The server device 1 generates one or a plurality of virtual camera videos IM on the basis of the physical camera videos PP1, PP2, and PP3 by the function of the video control unit 10. Here, an example of generating four virtual camera videos IM1, IM2, IM3, and IM4 is illustrated.

The virtual camera video IM refers to a video that can be generated on the basis of a physical camera video that is a moving image actually captured by the camera 2. In other words, without being bound by the angle of view or the like of the physical camera video PP, it broadly refers to a video that can be obtained by video processing or the like on the physical camera video PP.

For example, there are the following videos as the virtual camera video IM.

- Video same as physical camera video (video as captured by physical camera)
- Video obtained by cutting out part of physical camera video
- Video in which some video processing is performed on physical camera video or cutout video thereof Then, in the present disclosure, the virtual camera video IM has a meaning as a video that is a candidate for use in video content that is an output video. For example, in the case of FIG. 4, four virtual camera videos IM1, IM2, IM3, and IM4 are set as candidates, and are sequentially selected by the output control unit 11 to be the distribution video CT.

The output control unit 11 performs processing as a switcher, for example, and sequentially selects the virtual camera videos IM1, IM2, IM3, and IM4. The selected virtual camera video IM is a video of one period of the moving image as the distribution video CT.

Such a virtual camera video IM is a video that can be generated from the physical camera video PP, and thus, the following control can be considered as composition update control of the virtual camera video IM.

- Control cutout range from physical camera video PP
- Control of imaging direction and angle of view of camera 2
- Both control of imaging direction and angle of view of camera 2 and control of cutout range from physical camera video PP Various virtual camera videos IM can be generated from the physical camera video PP by controlling the cutout range from the physical camera video PP as the composition update control. The cutout range can also be said to be control for setting a position and a size at which cutout is performed in an image.

For example, the virtual camera video IM2 in FIG. 4 is generated from the physical camera video PP2.

Figure 5:
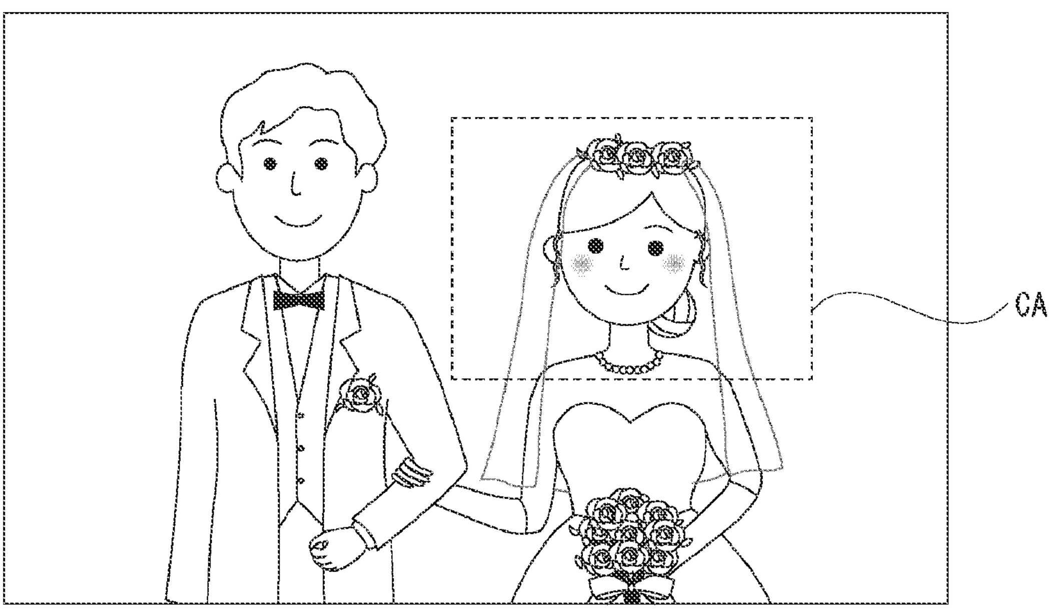
FIG. 5 is an explanatory diagram of a virtual camera video cut out from a physical camera video according to the embodiment.
Figure 5:
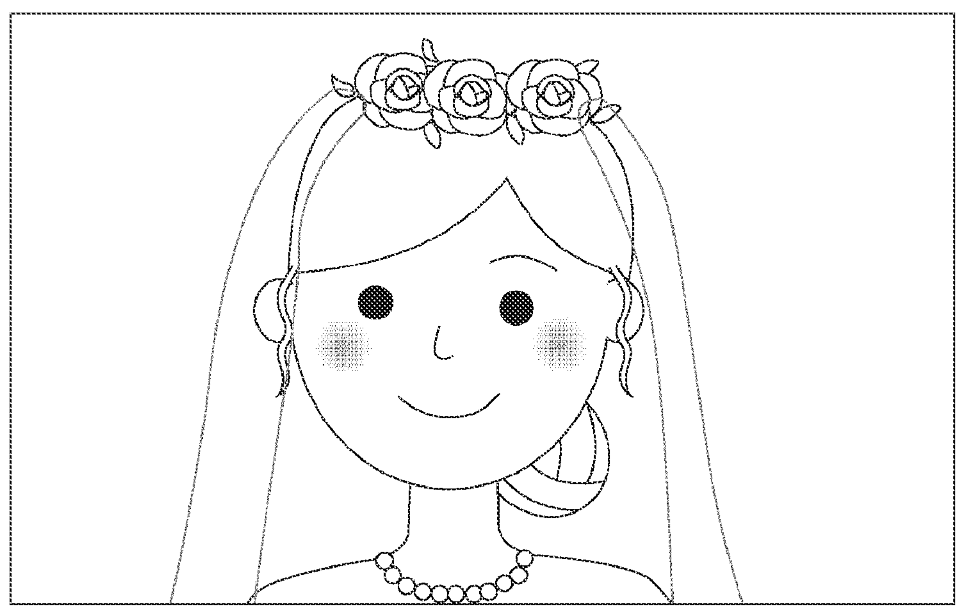

FIG. 5 illustrates an original physical camera video PP2 and a virtual camera video IM2. The virtual camera video IM2 can be generated by setting the cutout range CA as indicated by a broken line for the physical camera video PP2 and performing cutout processing and processing such as necessary enlargement and pixel interpolation according to the cutout processing.

In addition, the virtual camera video IM1 of FIG. 4 is a video in which a range including two persons at the center in the physical camera video PP1 is generated as a cutout range CA.

In addition, the virtual camera video IM3 is a video in which a range including two persons at the right corner of the physical camera video PP3 is generated as a cutout range CA.

By such cutout processing, various virtual camera videos IM can be generated.

It is also possible to generate a plurality of virtual camera videos IM having different settings of the cutout range CA from one physical camera video PP.

Various virtual camera videos IM can also be generated by controlling the imaging direction and the angle of view of the camera 2 as composition update control.

For example, the virtual camera video IM4 in FIG. 4 is a video using the physical camera video PP3 as it is. In this case, the video control unit 10 performs control such as panning, tilting, and zooming on the camera 2C, so that the person to be captured is changed or the size of the subject person (the size in the video) is changed. Accordingly, the subject person and the subject size of the virtual camera video IM4 are also changed. That is, the composition is updated.

In addition, by combining both the control of panning, tilting, zooming, and the like with respect to the camera 2 and the setting control of the cutout range CA, the subject person and the subject size in the virtual camera video IM can be changed.

Note that, as described above, the composition update control that causes a change in the virtual camera video IM can also be said to be control that changes a subject such as a person who is a subject in the virtual camera video IM, or changes the in-screen size or the in-screen position of the subject.

Figure 7:
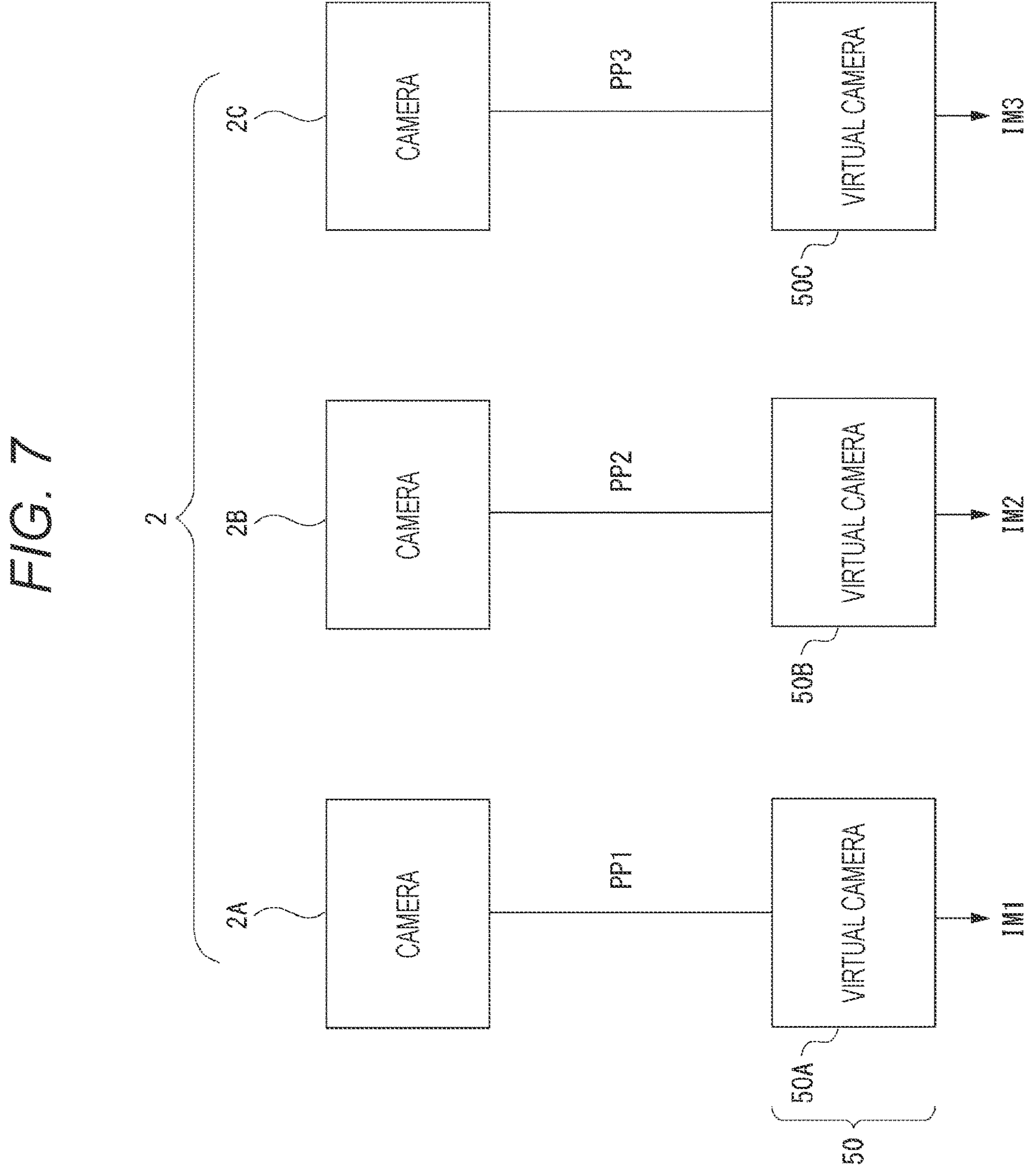
FIG. 7 is an explanatory diagram of a correspondence relationship between virtual cameras and physical cameras according to the embodiment.
Figure 8:
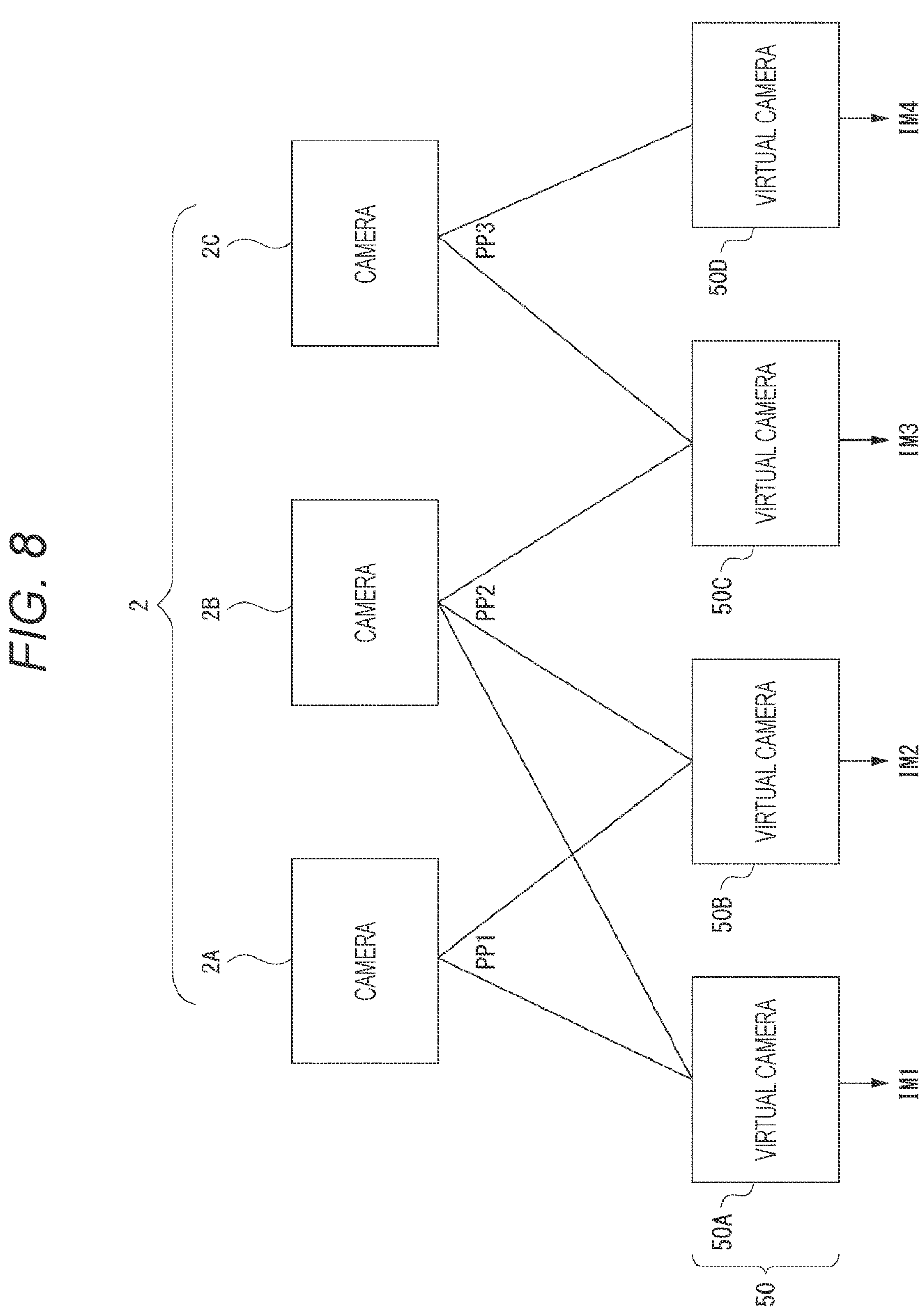
FIG. 8 is an explanatory diagram of a correspondence relationship between virtual cameras and physical cameras according to the embodiment.

FIGS. 6, 7, and 8 illustrate examples of the correspondence relationship between the physical camera video PP by one or a plurality of cameras 2 and a virtual camera 50 that generates the virtual camera video IM.

The virtual camera 50 indicates processing of generating the virtual camera video IM in the video control unit 10.

FIG. 6 illustrates an example in which each virtual camera video IM may be generated from any physical camera video PP.

In the drawing, the correspondence relationship between the real cameras 2A, 2B, and 2C and the virtual camera 50, in this case, the four virtual cameras 50A, 50B, 50C, and 50D is illustrated. That is, a case where virtual camera videos IM1, IM2, IM3, and IM4 of four systems are generated by the virtual cameras 50A, 50B, 50C, and 50D is exemplified.

In the example of FIG. 6, the virtual camera 50A corresponds to the cameras 2A, 2B, and 2C, and the virtual cameras 50B, 50C, and 50D also correspond to the cameras 2A, 2B, and 2C, respectively.

This indicates a relationship that the virtual camera videos IM1, IM2, IM3, and IM4 may be generated from any of the physical camera videos PP1, PP2, and PP3, respectively.

That is, in this case, each of the virtual cameras 50A, 50B, 50C, and 50D can freely select any one of the physical camera videos PP1, PP2, and PP3, perform composition update control of the virtual camera video IM, and generate the virtual camera videos IM1, IM2, IM3, and IM4.

The example of FIG. 7 is an example in which the virtual camera 50 and the existing camera 2 are made to correspond to each other 1:1.

The virtual camera 50A corresponds to only the camera 2A, and can generate the virtual camera video IM1 on the basis of the physical camera video PP1 by the camera 2A.

The virtual camera 50B corresponds to only the camera 2B, and can generate the virtual camera video IM2 on the basis of the physical camera video PP2 by the camera 2B.

The virtual camera 50C corresponds to only the camera 2C, and can generate the virtual camera video IM3 on the basis of the physical camera video PP3 by the camera 2C.

The example of FIG. 8 is an example in which the virtual camera 50 and the camera 2 irregularly correspond to each other.

The virtual camera 50A corresponds to the cameras 2A and 2B, and can generate the virtual camera video IM1 on the basis of any one of the physical camera videos PP1 and PP2.

The virtual camera 50B corresponds to the cameras 2A and 2B, and can generate the virtual camera video IM2 on the basis of any one of the physical camera videos PP1 and PP2.

The virtual camera 50C corresponds to the cameras 2B and 2C, and can generate the virtual camera video IM3 on the basis of any one of the physical camera videos PP2 and PP3.

The virtual camera 50D corresponds to only the camera 2C, and can generate the virtual camera video IM3 on the basis of the physical camera video PP3 by the camera 2C.

Various examples of the correspondence relationship between the virtual camera 50 and the camera 2 can be considered. The correspondence relationship may be set by a user operation, or the server device 1 may set the correspondence relationship using some element in automatic processing on the system.

In addition, although the case where the number of virtual cameras 50 is equal to or larger than the number of physical cameras 2 has been described in FIGS. 6, 7, and 8, the number of virtual cameras 50 may be smaller than the number of physical cameras 2. Furthermore, although the description has been given assuming the plurality of virtual cameras 50, the number of virtual cameras 50 may be one.

For example, one virtual camera 50 can generate the virtual camera video IM by selectively using a plurality of physical camera videos PP1, PP2, and PP3.

4. USER INTERFACE

Although the UI control unit 12 is also illustrated in FIG. 4, the UI control unit 12 performs control to display, for example, a UI video as illustrated in FIG. 9 on the operation terminal 3.

In the UI video of FIG. 9, one screen is divided into a physical camera video area 60, a virtual camera video area 61, an output video area 62, a next video area 63, and a parameter area 66.

The physical camera video PP is displayed in the physical camera video area 60 at the lower part of the screen. For example, in a case where three cameras 2A, 2B, and 2C are used, physical camera videos PP1, PP2, and PP3 by the respective cameras 2 are displayed in the physical camera video area 60.

The virtual camera video IM is displayed in the virtual camera video area 61. In a case where the video control unit 10 generates virtual camera videos IM1, IM2, IM3, and IM4 of four systems by the four virtual cameras 50, the virtual camera videos IM1, IM2, IM3, and IM4 are displayed as illustrated in the drawing.

In the output video area 62, the video currently distributed as the distribution video CT among the virtual camera videos IM1, IM2, IM3, and IM4 is displayed. This example illustrates a case where the virtual camera video IM4 is selected as the distribution video CT.

Note that a current frame 64 indicating that the video is currently selected and distributed and output is displayed for the virtual camera video IM4 in the virtual camera video area 61.

In the next video area 63, a video selected as the distribution video CT at the next timing is displayed. This example illustrates a case where the virtual camera video IM3 is selected as the next video.

Note that a next frame 65 indicating selection as the next video is displayed for the virtual camera video IM3 in the virtual camera video area 61.

In the parameter area 66, the frame number (time stamp), the cumulative time of the distribution video CT, the duration of the currently selected video (time from switching), and the like are displayed.

By displaying such a UI video on the operation terminal 3 by the UI control unit 12, the user (video production staff) who uses the operation terminal 3 can select the next video while confirming the current distribution content.

For example, the user can perform an operation to select any one of the virtual camera videos IM1, IM2, IM3, and IM4 in the virtual camera video area 61. Then, the selected video is entered as the next video. At the subsequent switching timing, the next video is output as the distribution video CT.

For example, the UI control unit 12 detects the selection operation of the user while displaying the UI video. Then, the UI video content is controlled according to the selection operation of the user, and a notification of the content of the selection operation is provided to the output control unit 11. The output control unit 11 switches the virtual camera video IM to be the distribution video CT accordingly.

As a result, the user of the operation terminal 3 can perform an operation as a switcher of the distribution video CT.

Figure 10:
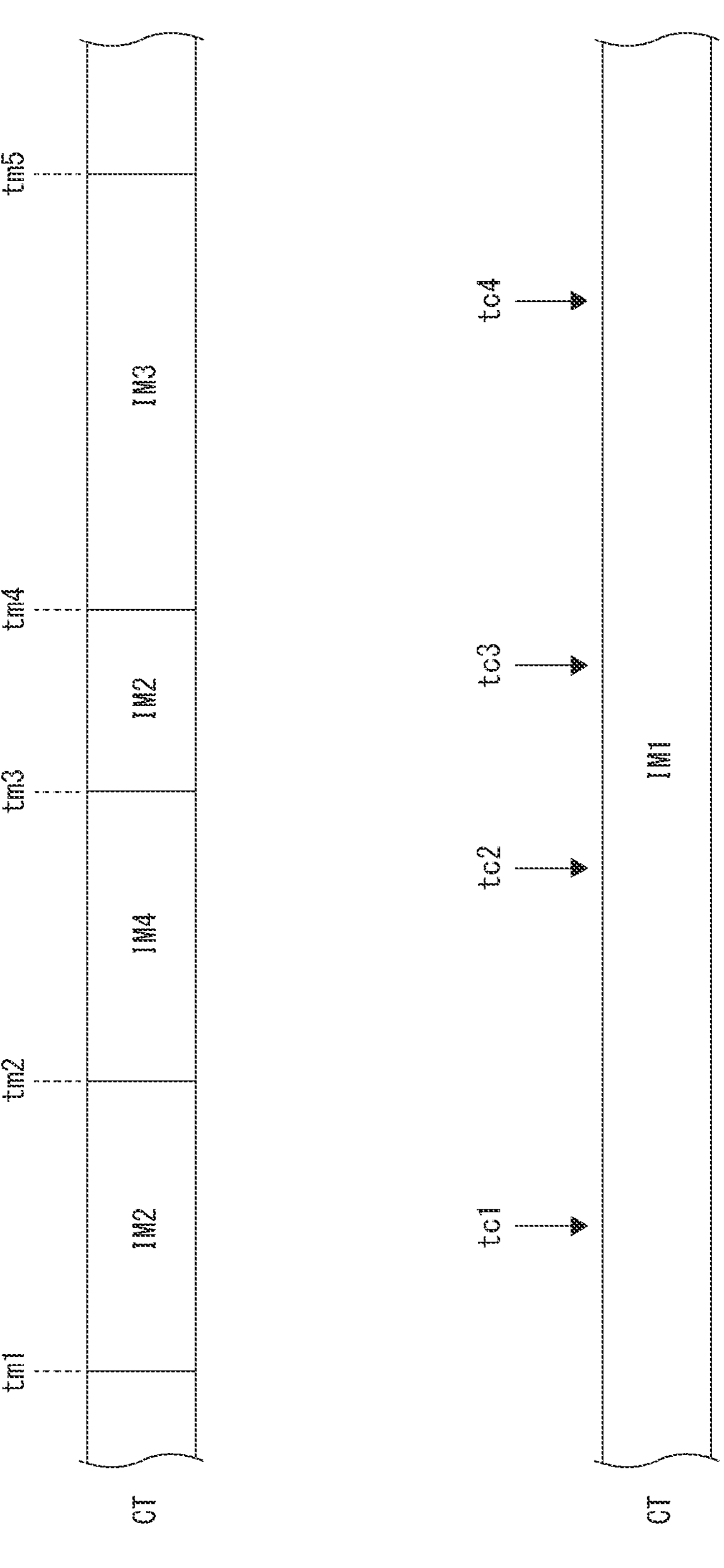
FIG. 10 is an explanatory diagram of a distribution video CT according to the embodiment.

FIG. 10A illustrates an example of the distribution video CT. For example, at time point tm1, the virtual camera video IM2 is distributed as the distribution video CT. Thereafter, switching is performed at time points tm2, tm3, tm4 . . . , and virtual camera videos IM4, IM2, IM3 . . . are sequentially used as the distribution video CT.

Note that, in this example, for example, a diagram in which the virtual camera video IM used for the distribution video CT is irregularly switched according to the operation of the user is illustrated, but the virtual camera video IM may be switched at regular time intervals.

Furthermore, the switching timing by the user operation may be, for example, after a certain time from the timing at which the user designates the next video, or may be the timing at which the user performs the predetermined switching operation after designating the next video.

As described above, the plurality of virtual camera videos IM is generated using the plurality of physical camera videos PP, and for each virtual camera video IM, the subject and the size, position, and the like of the subject in the screen are sequentially changed by the composition update control of the virtual camera video IM. Then, the plurality of virtual camera videos IM is switched and output as the distribution video CT as in the example of FIG. 10A, so that the distribution video CT including various scene contents can be easily generated.

However, only one system of virtual camera video IM may be used. For example, FIG. 10B illustrates an example in a case where only the virtual camera video IM1 is generated and used as the distribution video CT. In this case, it is possible to generate the distribution video CT including various scene contents by changing the subject of the virtual camera video IM1, the size, the position, and the like of the subject in the screen by the composition update control of the virtual camera video IM at each timing indicated as the time points tc1, tc2, tc3, tc4 . . . .

Note that, in a case where the virtual camera video IM of only one system is generated, the physical camera video PP may be one system or a plurality of systems. That is, one or a plurality of cameras 2 may actually capture images. By using the plurality of cameras 2, it is possible to increase the variation of the video constituting the scene also in that the physical camera video PP is selected when the virtual camera video IM is generated.

Furthermore, an example of using a plurality of cameras 2 in the case of generating virtual camera videos IM of a plurality of systems as illustrated in FIG. 4 has been described with reference to FIGS. 6, 7, and 8, but an example of using only one camera 2 is also conceivable. This is because virtual camera videos IM of a plurality of systems can be generated on the basis of one physical camera video PP, for example, by making the cutout range different or using different video effects or the like.

Meanwhile, in a case where the UI video as illustrated in FIG. 9 is considered, there is a tendency that the user is less likely to be confused when the correspondence relationship between the virtual camera video IM and the physical camera video PP is fixed to some extent. Therefore, for example, as described with reference to FIGS. 7 and 8, it may be preferable to limit the relationship between the virtual camera video IM and the physical camera video PP to some extent.

On the other hand, by not limiting the relationship between the virtual camera video IM and the physical camera video PP as illustrated in FIG. 6, each of the virtual camera videos IM can be videos with more various contents.

5. VIDEO PRODUCTION PROCESSING

A specific example of video production processing by the server device 1 in the video production system of FIG. 1 will be described. As described with reference to FIG. 4, the server device 1 generates the virtual camera video IM on the basis of the physical camera video PP, and produces the distribution video CT using the virtual camera video IM.

In this case, the video content of the virtual camera video IM is automatically changed as the composition update control of the virtual camera video IM. Hereinafter, this composition update control will be mainly described.

For example, a case is assumed where the distribution video CT is produced and distributed by imaging at an event such as a wedding.

Prior to starting shooting, the user (video production staff) performs some settings in advance. For example, the face of an individual and the importance of a person are registered as follows.

Individual Face Registration

For example, the face of a main person is registered in advance. For example, the video production staff registers, in the server device 1, the faces of persons considered to be the characters of the event, such as the faces of the groom and bride, the faces of the parents, and the face of the principal guest. The faces of many persons who can be subjects may be registered, or the faces of only important persons may be registered. The face is registered in order to perform personal identification on a person shown in the physical camera video PP or the distribution video CT.

Note that it is not necessary to register all the persons in advance. For example, in a case where a face of an unregistered person is detected during actual shooting (during distribution), it is conceivable to additionally register an image of the face with an arbitrary identification code.

Registration of Importance of Person

The degree of importance of a person who is a subject in an event is registered. For example, the importance of a main person is increased. For example, it is conceivable to rank the registered face image as “high”, “medium”, “low”, or the like. Alternatively, the face image may be registered as a “highly important person” so that only an important person can be specified.

The importance is for identifying an important person in an event. The important person can be said to be a person in a position as a main character as the distribution video CT of the event. In the case of a wedding or a reception party, the bride and the groom are set to have high importance.

Such information regarding the subject person is stored in, for example, the RAM 73, the storage unit 79, or the like in the information processing apparatus 70 as the server device 1, and can be sequentially referred to by the CPU 71 or the AI processor 85.

Various specific methods for registration can be considered. For example, the event participant is captured before the start of the event, and the server device 1 extracts the face of each person by face detection processing from the captured video. Then, it is only required to provide a user interface that causes the operation terminal 3 to display the face image and allows the video production staff to set the importance in association with the face image.

After performing the pre-registration regarding the subject person as described above, shooting and distribution are started.

Figure 11:
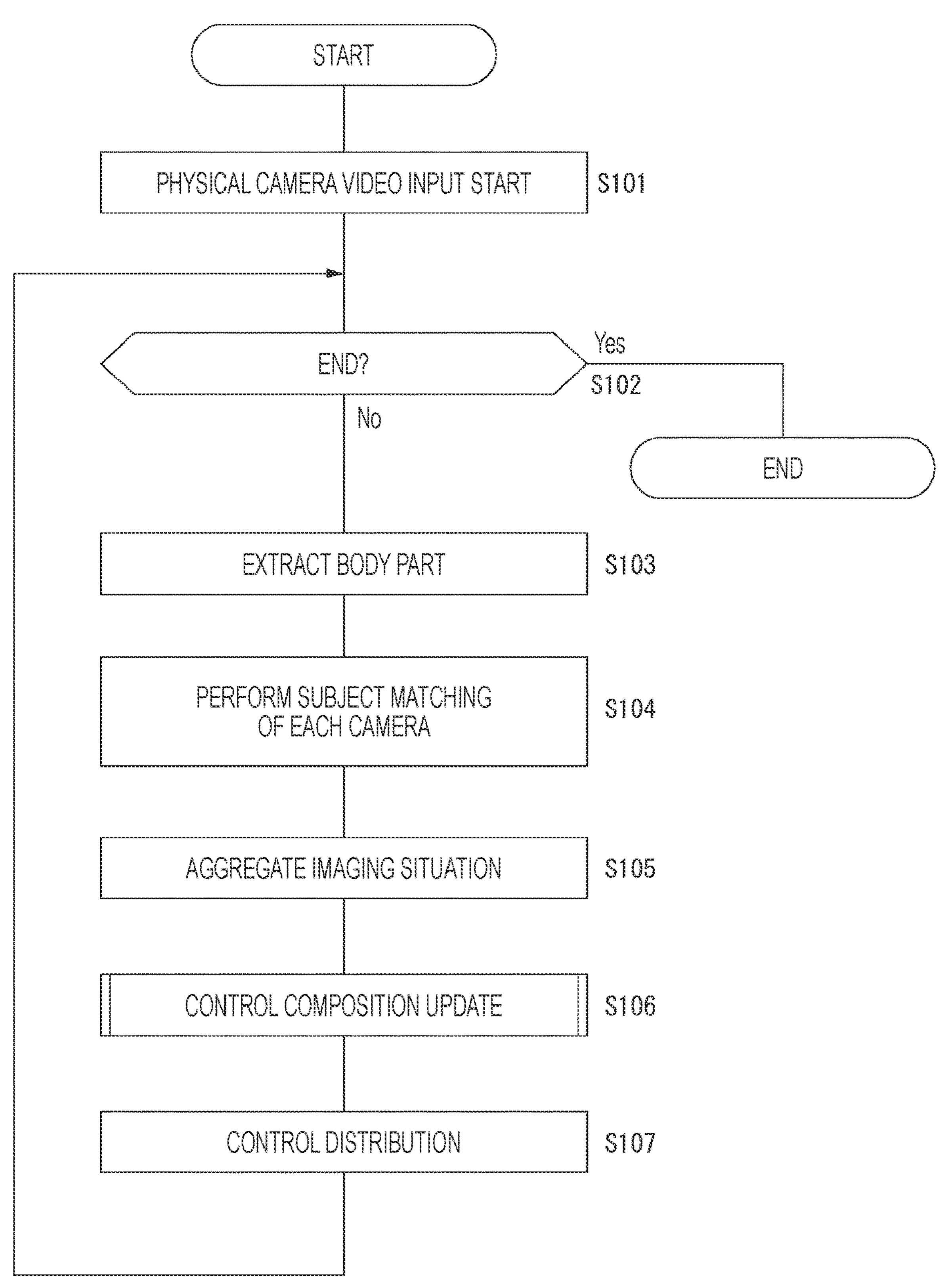
FIG. 11 is a flowchart of video production processing of the information processing apparatus according to the embodiment.

FIG. 11 illustrates processing of the server device 1 after shooting and distribution are started. Here, the processing of the server device 1 is processing executed by the functions of the video control unit 10, the output control unit 11, and the UI control unit 12 described above.

In step S101, the server device 1 starts inputting the physical camera video PP. For example, input of the physical camera videos PP1, PP2, and PP3 as moving images transmitted from the cameras 2A, 2B, and 2C is started.

In step S102, the server device 1 determines the end of distribution or video processing. During a period until it is determined that the processing is ended, the server device 1 repeats the processing from step S103 to step S107.

Figure 12:
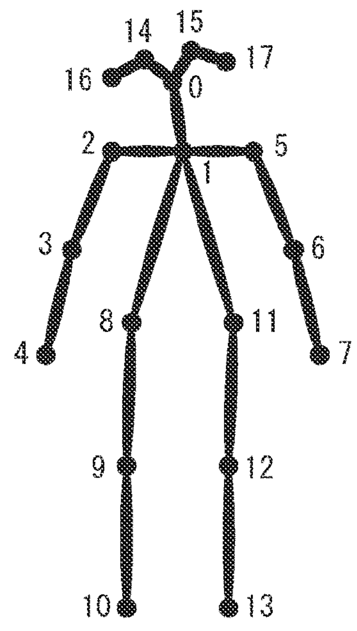
FIG. 12 is an explanatory diagram of extraction of a human body part.

In step S103, the server device 1 performs extraction processing of the human body part for each of the physical camera videos PP1, PP2, and PP3. For example, the server device 1 extracts the human body part as illustrated in FIG. 12 in the video of the physical camera video PP on the basis of the image analysis and the machine learning processing.

In step S104, the server device 1 performs matching of the subjects of the cameras 2A, 2B, and 2C. This matching is to determine the same person for the person detected in the physical camera videos PP1, PP2, and PP3 of the cameras 2A, 2B, and 2C, that is, the subject from which the human body part is extracted.

Figure 13:
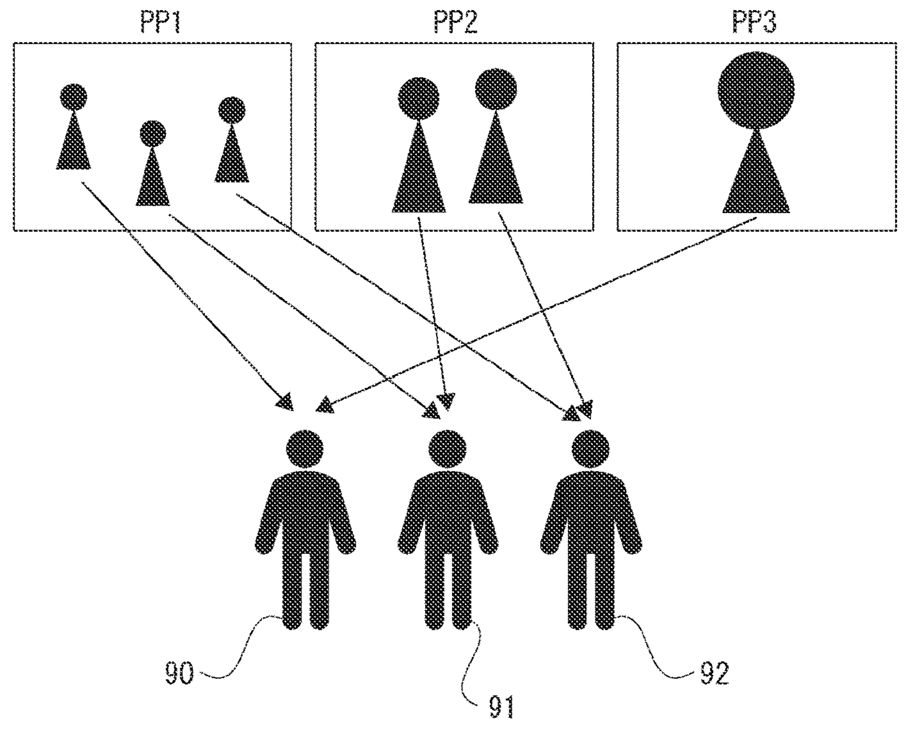
FIG. 13 is an explanatory diagram of subject matching in a physical camera video according to the embodiment.

FIG. 13 illustrates physical camera videos PP1, PP2, and PP3. It is assumed that one or a plurality of persons is included in each of the physical camera videos PP1, PP2, and PP3.

In this case, the server device 1 determines that, for example, the left person of the physical camera video PP1 and the person of the physical camera video PP3 are the same person 90. In addition, the person at the center of the physical camera video PP1 and the person on the left of the physical camera video PP2 are determined to be the person 91. The person on the right of the physical camera video PP1 and the person on the right of the physical camera video PP2 are determined to be the person 92.

For example, subject matching is performed in this manner.

As the matching means,

Geometric technique by calibration

Use of face identification result

Use of body feature amount and the like are conceivable.

As a geometric technique by calibration, for example, calibration is performed in advance to detect installation positions (relative positions) of the cameras 2A, 2B, and 2C, and calculation is performed on the basis of a current imaging direction (horizontal direction, vertical direction), an angle of view (zoom magnification), and the like, whereby whether or not the same subject exists as a subject in each physical camera video PP can be determined.

In addition, the same person can be determined by comparing the face identification of the subject and the body feature amount in each physical camera video PP.

In step S105, the server device 1 aggregate the imaging situation. For example, Which video was distributed How much video of each person was distributed How Long is current video continued?

and the like are aggregated.

In terms of "which video is distributed", the following aggregation is assumed.

First, it is conceivable to aggregate how much each of the captured videos by the cameras 2A, 2B, and 2C is used for distribution. That is, the cumulative usage count and cumulative time of the physical camera videos PP1, PP2, and PP3, which are the sources of the virtual camera videos IM used for the distribution video CT, with respect to the distribution video CT so far.

In addition, it may be determined which one of the physical camera videos PP1, PP2, and PP3 the virtual camera video IM based on is currently used for distribution.

Furthermore, it is also conceivable to aggregate the cumulative number of uses and the cumulative use time of the virtual camera videos IM1, IM2, IM3, and IM4 for the distribution video CT so far.

The following aggregation is assumed for "how much the video of each person is distributed".

For each subject person identified by the face image, the number of times of appearance in the distribution video CT and the cumulative time are aggregated.

Note that, for each subject person, the number of times or a cumulative time of appearance in each physical camera video PP may be aggregated.

In addition, for each subject person, the number of times or a cumulative time of appearance in each virtual camera video IM may be aggregated.

"How many seconds the current video continues" means how many seconds the virtual camera video IM currently selected as the distribution video CT continues. That is, it is the duration from the switching of the immediately preceding virtual camera video IM.

In step S106, the server device 1 performs composition update control of the virtual camera video IM. That is, for each of the virtual camera videos IM1, IM2, IM3, and IM4, control is performed to change the composition as necessary and cause a change in the video. For example, control is performed to change the subject or change the position and size of the subject in the video. It can be said that the processing is processing in which each virtual camera 50 controls who is the subject, which camera 2 is used, and with what composition. Details will be described later.

In step S107, the server device 1 performs distribution control.

That is, the server device 1 selects any one of the virtual camera videos IM1, IM2, IM3, and IM4 and distributes and outputs the selected virtual camera video as the distribution video CT. As described above, the output control unit 11 selects the virtual camera video IM according to the operation by the video production staff using the operation terminal 3. Alternatively, the output control unit 11 may sequentially switch the virtual camera video IM automatically and output the virtual camera video IM as the distribution video CT.

Hereinafter, the composition update control of the virtual camera video IM in step S106 will be described in detail with reference to FIG. 14.

Figure 14:
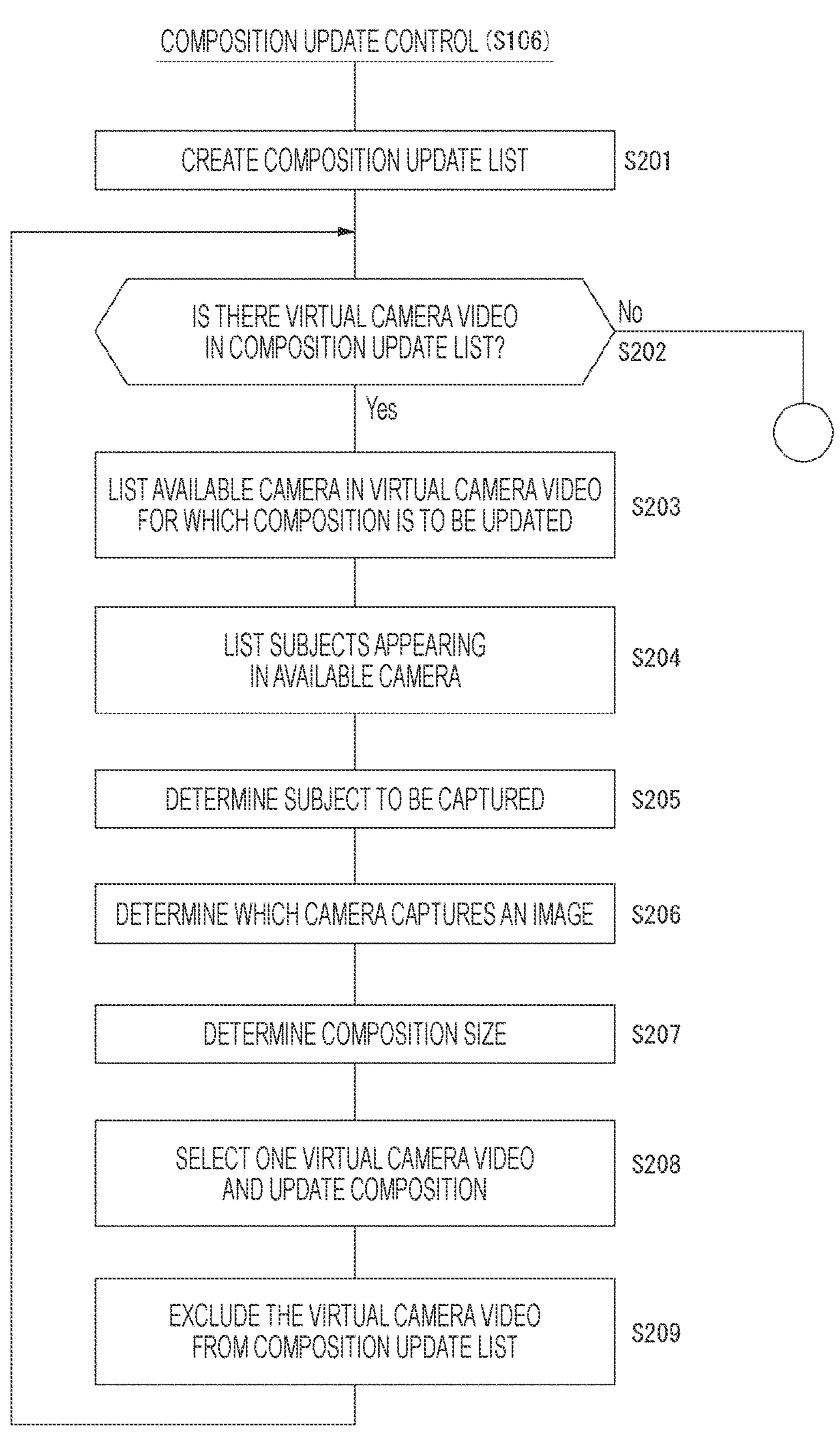
FIG. 14 is a flowchart of composition update control of the information processing apparatus according to the embodiment.

The processing of FIG. 14 is executed by the function of the video control unit 10 in the server device 1, and is a processing example of performing control to cause a change in each virtual camera video IM as necessary.

Note that, since the physical camera video PP and the virtual camera video IM based on the physical camera video PP are moving images, the composition update control does not indicate that the composition changes due to the movement of the subject on the time axis in the moving image, but indicates that the imaging direction and the angle of view of the virtual camera 50 are changed by the control.

From the viewpoint of the subject included in the virtual camera video IM, specifically, it refers to changing the subject included in the virtual camera video IM to a different person, changing the subject size in the video as the whole body, bust shot, face up, or the like of the subject in the video, changing the position of the subject in the video, or the like.

In addition, from the viewpoint of specific control, the composition update control is control of setting change of the cutout range from the physical camera video PP or control of panning, tilting, and zooming of the camera 2.

In step S201 of FIG. 14, the server device 1 creates a composition update list. For example, at the timing when the virtual camera video IM to be the distribution video CT is switched or the like, the composition update list is created to review the composition of each virtual camera video IM. This may be performed at a timing according to a user's operation, or at a timing based on video content or some trigger. For example, the composition update list creation may be performed when the video content of some of the virtual camera videos IM is lost in the tracking subject, is not detected in the person, is blurred, or the like.

The composition update list is an entry of the virtual camera videos IM1, IM2, IM3, and IM4 for which the composition is updated.

However, the virtual camera video IM being selected as the distribution video CT is not included in the composition update list.

In addition, the virtual camera video IM in which the subject is lost is actively included in the composition update list. For example, in the virtual camera video IM based on the physical camera video PP tracking a specific person, there is a case where the person is framed out.

After creating the composition update list, the server device 1 checks whether or not there is the virtual camera video IM entered in the composition update list in step S202. This is confirmation of the unprocessed virtual camera video IM. Then, the server device 1 repeats the processing from step S203 to step S209 until it is determined that there is no unprocessed virtual camera video IM.

In step S203, the server device 1 lists the available camera 2, that is, the available physical camera video PP, for one or a plurality of virtual camera videos IM listed in the composition update list at that time.

As described with reference to FIGS. 6, 7, and 8, since the correspondence relationship between each virtual camera 50 and the camera 2 is set, there may be a physical camera video PP that cannot be used by each virtual camera 50. Therefore, in step S203, the physical camera video PP that can be used as an original is checked for each virtual camera video IM entered in the composition update list.

For example, in a case where the virtual camera video IM1 is entered in the composition update list, the virtual camera video IM1 is confirmed. In the case of the example of FIG. 6, the physical camera videos PP1, PP2, and PP3 can be used as the original video in the virtual camera video IM1. In the case of the example of FIG. 7, only the physical camera video PP1 can be used as the original video in the virtual camera video IM1. In the case of the example of FIG. 8, the physical camera videos PP1 and PP2 can be used as the original video in the virtual camera video IM1.

If the virtual camera video IM2 is also entered in the composition update list at that time, the physical camera video PP that can be similarly used for the virtual camera video IM2 is confirmed.

In accordance with the setting of such a correspondence relationship, the server device 1 lists all the physical camera videos PP that can be used in one or more virtual camera videos IM among one or a plurality of virtual camera videos IM listed in the composition update list at this time.

In step S204, the server device 1 lists the subjects appearing in the listed available physical camera videos PP.

In step S205, the server device 1 determines a subject to be captured from among the subjects listed in step S204. In this case, for example, the person satisfying the following condition is preferentially selected on the basis of the determination information such as the aggregation result of the imaging situation in step S105 of FIG. 11, the content of the current distribution video CT, and the content of the current physical camera video PP.

Speaking person
Person with high importance
Person not appeared in current distribution video CT
Person with small number of times of appearance and cumulative time in distribution video CT
Person determined to be in specific emotion
Person other than person that has continued in distribution video CT for predetermined time or more (or has appeared)

The server device 1 performs action determination for the listed subjects, and in a case where the presence of a person who is speaking can be determined, the person is preferentially selected as the subject. The reason why the person who is talking is prioritized is that the person can be estimated as a person to be focused on at the site.

The person with high importance is a person who is the main character of the event or a person with high importance rank by the above-described registration in advance. In a case where the server device 1 determines that there is a person corresponding to a person with high importance registered in advance among the listed subjects, the server device 1 preferentially selects the person as the subject.

Note that the importance is not only registered in advance, but may also be determined to be important depending on the situation of the scene. For example, a person determined to be performing some performance such as speech, music, dance, or performance by action determination may be preferentially selected as a subject as a person of high importance in the scene.

The person who does not appear in the current distribution video CT means to avoid the same person from continuously appearing in the distribution video CT. In a case where the server device 1 determines that there is the same person as the person appearing in the current distribution video CT among the listed subjects, the server device 1 preferentially selects a person other than the person. This is to prevent the content of the distribution video CT from becoming monotonous as the same person continues to appear.

The reason why the person who has appeared in the distribution video CT less times and cumulative time is prioritized is that the person who does not appear in the distribution video CT at all among the participants of the event is eliminated as much as possible, and accordingly, the characters of the distribution video CT are diversified to enhance the video value.

In a case where the server device 1 detects a person whose number of appearances and appearance cumulative time are determined to be small from among the listed subjects with reference to the aggregation result in step S105 in FIG. 11, the server device 1 preferentially selects the person as the subject.

The person determined to be in a specific emotion is, for example, a person who is happy, a person who is smiling, a person who is crying, a person who is impressed, or the like. The server processing estimates the emotion of the subject by analyzing the expression of the subject person, analyzing the posture of the body, and the like. Then, in a case where a person determined as “happy”, “smiling”, “crying”, “impressed”, or the like is detected, the person is preferentially selected as the subject.

A person who continuously appears in the distribution video CT for a predetermined time or more is a person who continuously appears in the distribution video CT for a certain long time exceeding a predetermined threshold, or a person who has continuously appeared in the distribution video CT. In a case where the server device 1 determines that a person among the listed subjects continuously appears in the distribution video CT for a predetermined time or more, the server device 1 selects a person prioritized under any one of the above conditions as the subject among the other persons except for the person.

The server device 1 determines a subject to be captured among the listed subjects under the above conditions, for example. Only one person may be selected as the subject to be captured, or a plurality of persons may be selected as the group shot.

In step S206, the server device 1 determines which camera 2 captures an image.

For example, in a case where the subject determined to be captured is shown in only one physical camera video PP, the subject is the camera 2 of the physical camera video PP.

For example, in a case where the subject determined to be captured is shown in the plurality of physical camera videos PP, it is conceivable to preferentially select the camera 2 that is or can be captured from the front or the camera 2 that is or can be captured with a relatively large size.

In step S207, the server device 1 determines the composition size. For example, setting of the cutout range (position and size) and setting of the zoom magnification of the camera 2 are performed.

In particular, for the cutout range, the composition size is set within a range not lower than the set minimum resolution. For example, when an excessively small range is cut out and enlarged in the physical camera video PP, the resolution is significantly reduced. Therefore, the minimum resolution is set to avoid such a state.

Furthermore, in a case where the camera 2C capable of pan, tilt, and zoom control is used, the composition size is set in consideration of the movable range.

The composition size can also be set in consideration of the appearance of the person next to the subject person to be captured. For example, when the adjacent person is cut at the edge of the screen and the composition size can be set to add the adjacent person, or in a case where the composition is unbalanced, the composition size can be determined to include or exclude the adjacent person.

In addition, if the composition size is designated by the user, the composition size is only required to be preferentially determined.

Furthermore, a composition similar to the composition of the current distribution video CT may be avoided. For example, in a case where the current distribution video CT is the close-up of the face of a certain person, the composition size is set to an overhead composition, a bust shot composition (close-up of parts other than the face), a group shot composition (composition including a plurality of persons), or the like.

Furthermore, composition setting may be performed such that a specific composition, for example, a composition to be a bird’s-eye view video is selected at a certain time interval.

In step S208, the server device 1 selects the virtual camera video IM that can be generated on the basis of the physical camera video PP of the camera 2 determined in step S206 from the composition update list.

Note that, as illustrated in FIG. 7, when the correspondence relationship between the camera 2 and the virtual camera 50 is 1:1, the virtual camera video IM whose composition is updated is naturally determined.

In a case where there is a plurality of virtual camera videos IM that can use the physical camera video PP of the camera 2 determined in step S206 in the composition update list at that time, the selection is only required to be performed in ascending order of the index set for the virtual camera video IM.

Then, the server device 1 updates the composition of the selected virtual camera video IM.

That is, the setting of the cutout range from the physical camera video PP, the pan, tilt, and zoom control of the camera 2, or both are performed such that the video corresponding to the subject to be captured, the original physical camera video PP, and the composition size determined in the processing so far can be obtained as the video of the virtual camera 50.

Then, in step S209, the server device 1 excludes the virtual camera video IM for which the composition update has been completed from the composition update list, and returns to step S202.

The server device 1 repeats steps S203 to S209 until the virtual camera video IM does not exist in the composition update list.

When it is confirmed in step S202 that the virtual camera video IM does not exist in the composition update list, the server device 1 ends the processing of FIG. 14.

By such processing, composition update processing for one or a plurality of virtual camera videos IM listed in the composition update list is performed at a certain timing.

By automatically updating the composition of the virtual camera video IM, the output distribution video CT can be made higher quality video content.

This is because the plurality of virtual camera videos IM is output as the distribution video CT while being manually operated or automatically switched in step S107 of FIG. 11, and each of the virtual camera videos IM1, IM2, IM3, and IM4, which are candidates to be selected, is automatically updated in composition. Moreover, this is also because, in the composition update, an appropriate subject, an appropriate camera 2, and an appropriate composition are set in steps S205, S206, and S207 in FIG. 14 using the aggregation result of the imaging situation in step S105 in FIG. 11.

That is, the AI processor 85 or the CPU 71 automatically executes subject selection, camera selection, composition setting, and the like normally performed by a skilled camera operator, so that the video production staff can produce the high-quality distribution video CT without taking time and effort.

For example, it is assumed that the following video content is obtained in the distribution video CT by performing the composition update control of FIG. 14.

A relatively large number of people registered with high importance appear

The number of appearances of a person with low importance is reduced, but the person will be ensured to appear Scene in which same person appears does not continue for long time A person to be noted appears in the scene, such as a person talking or a person performing performance There is a high possibility that each person is captured as a video of an angle considered as being as good as possible In consideration of the balance of the composition and the presence of a person around the main subject, an undesirable composition is avoided Video with low resolution (enlarged video) is not obtained Therefore, it is possible to realize the production of the distribution video CT with satisfactory content quality without taking time and effort of the video production staff.

6. SUMMARY AND MODIFICATION EXAMPLES

According to the above embodiment, the following effects may be obtained.

The information processing apparatus 70 functioning as the server device 1 according to the embodiment includes the video control unit 10 that generates the virtual camera video IM used for the distribution video CT (output video) on the basis of the physical camera video PP (captured video) by the camera 2 and performs composition update control of the virtual camera video IM on the basis of the determination information regarding the subject in the physical camera video PP or the distribution video CT.

By generating the virtual camera video IM from the physical camera video PP which is the actual captured video by the camera 2 and producing the distribution video CT using the virtual camera video IM, it is possible to produce the distribution video CT of the video content not limited only to the angle of view, the imaging direction, and the subject content of the actual physical camera video PP. In this case, the content quality of the distribution video CT can be improved by controlling the composition of the virtual camera video IM to be changed on the basis of the determination information regarding the subject. For example, it is possible to ensure that the same composition or the same person continues, that the main person does not appear very often, and that the person with low importance frequently appears in the distribution video CT, so that the video content reflecting the importance and balance of the characters can be made.

Note that, in the embodiment, the production of the video content distributed via the network has been mainly described as an example of the distribution video CT. However, the technology of the embodiment can be similarly applied to production of the video content as the broadcast video used for television broadcasting or the like, or the video content as the recorded video to be recorded in the recording medium without distribution or broadcasting at that time. That is, each effect described in the present disclosure is similarly effective in a case where the output video is a broadcast video, a recorded video, a video to be transmitted to another device, or the like.

An example has been described in which the video control unit 10 of the server device 1 according to the embodiment generates the virtual camera video IM by cutting out from the physical camera video PP, and performs setting control of a cutout range from the physical camera video PP as composition update control (see FIG. 14).

The virtual camera video IM can be generated by cutting out from the physical camera video PP. By performing cutout from the physical camera video PP, it is possible to obtain the virtual camera video IM of various contents regardless of the captured contents by the composition of the actual physical camera video PP, for example, by cutting out the close-up video of a specific person from the video in which a large number of persons appear to obtain the virtual camera video IM or the like.

Then, in this case, as the control based on the determination information regarding the subject, the virtual camera video IM appropriate for the distribution video CT can be generated by setting the cutout range, that is, the cutout position and the size of the cutout region from the image plane of the physical camera video PP.

In the embodiment, an example has been described in which the video control unit 10 performs control related to the imaging operation of the camera 2 as the composition update control (see FIG. 14).

For example, zoom control, pan/tilt control, or the like of the camera 2 are performed as control related to the imaging operation, and the physical camera video PP itself is changed.

By changing the angle of view and the viewing direction of the physical camera video PP itself, it is possible to change the composition of the virtual camera video IM generated from the physical camera video PP, to diversify the video content, and to include an appropriate subject.

Note that, by performing movement control on an object on which the camera 2 is mounted, such as a moving body or a flying object such as a drone, the imaging operation of the camera may be indirectly controlled.

In the embodiment, an example has been described in which the video control unit 10 generates the virtual camera video IM on the basis of the plurality of physical camera videos PP by the plurality of cameras 2.

For example, the physical camera videos PP are input from the plurality of cameras 2 such as the cameras 2A, 2B, and 2C, and the virtual camera video IM is generated using the physical camera videos PP. By using a plurality of cameras 2, for example, various captured videos can be obtained for a scene in an event. Therefore, the content of the virtual camera video IM to be generated can be diversified, and the distribution video CT that is not monotonous and interesting can be produced.

In the embodiment, an example has been described in which the video control unit 10 generates a plurality of virtual camera videos IM.

For example, a plurality of virtual camera videos IM such as virtual camera videos IM1, IM2, IM3, and IM4 is generated. As a result, the distribution video CT can be produced by selectively using the virtual camera video IM. That is, a plurality of virtual camera videos IM can be generated as candidates of videos to be adopted as the distribution video CT.

By generating various virtual camera videos IM as candidates for output such as distribution, the content of the distribution video CT can also be diversified by the selection, and an interesting distribution video CT can be produced.

In particular, in a case where the user performs a selection operation using the UI video as illustrated in FIG. 9, it is preferable to generate a plurality of virtual camera videos IM as a plurality of candidates and present the plurality of virtual camera videos IM to the user.

Note that the plurality of virtual camera videos IM may be generated as different cutout ranges from one physical camera video PP, or may be generated using any of the plurality of physical camera videos PP.

In the embodiment, an example has been described in which the video control unit 10 performs composition update control so that a specific subject is preferentially included in the virtual camera video IM.

For example, zooming, panning, and tilting of the camera 2 are controlled such that a specific person is included in the virtual camera video IM, and a cutout range from the physical camera video PP is set. As a result, the virtual camera video IM including the specific subject is generated. For example, by selecting an appropriate person as the flow of the moving image of the distribution video CT and including the selected person in the virtual camera video IM, the person appearing in the distribution video CT can be optimized. For example, a video can be obtained in which a person who is currently performing a central action, a main person, a person with low importance, or the like is balanced.

Note that the following examples are conceivable as the control to preferentially include a specific subject, and any of these may be considered, or a plurality of processes may be performed. Of course, the present invention is not limited to the following examples.

- Control of setting composition and cutout range to include at least the subject
- Control for causing the physical camera to execute at least panning, tilting, and zooming in a state including the subject
- Control that the subject is center of composition
- Control to make the subject or a part of the subject (such as a face) larger than other subjects as the area in the image (the number of occupied pixels)
- Control to display the subject at center
- Control for following and capturing the subject
- Control for changing cutout position following the subject In the embodiment, an example has been described in which the determination information regarding the subject is determination information of the speaker in the subject of the physical camera video PP, and the video control unit 10 performs composition update control so that the speaker is preferentially included in the virtual camera video IM.

For example, in a case where a plurality of persons appears in the physical camera video PP and one person is speaking in speech or the like, control is performed so as to obtain the virtual camera video IM in which the speaker becomes a central subject. As a result, the distribution video CT including the speaker who is the important subject in the scene at that time can be produced.

In the embodiment, an example has been described in which the determination information regarding the subject is the determination information of the high importance setting in the subject of the physical camera video PP, and the video control unit 10 performs composition update control so that the subject of the high importance setting is preferentially included in the virtual camera video IM.

For example, the importance is set in advance for each person. Then, in a case where a person set to a high importance in advance, such as a main character or an important person of the event, is shown in the physical camera video PP, control is performed so as to obtain the virtual camera video IM such that the person with the high importance is extracted as a close-up shot or a bust shot or is arranged at the center of the scene. As a result, it is possible to produce the distribution video CT that includes as many important persons as possible as the persons to be included in the distribution video CT, such as a bride and a bridegroom at the wedding, for example.

Note that, although the setting of the importance is performed for each person in the example described above, the importance can be set not only for a person but also for an animal, an object, or the like. For example, the dog may be set to high importance, and the virtual camera video IM in which the dog is preferentially included may be generated from the physical camera video PP showing the dog or the like. It is also possible to set the importance for an animal of a specific species, an automobile, an airplane, a specific vehicle type, and the like.

In addition, the type of the event may be set by a user operation, and the importance of the object corresponding to the set type of the event may be set high. For example, in a case where "weddings" are selected as the type of the event, the importance may be set to be high for persons and objects involved in the event, such as the groom, the bride, the dress, the cake, and the flowers. As a result, the distribution video CT can be produced so as to include as many subjects related to the event as possible according to the type of the event.

In the embodiment, an example has been described in which the determination information regarding the subject is determination information based on the number of appearances or the appearance cumulative time in the distribution video CT of the subject of the physical camera video PP, and the video control unit 10 performs composition update control such that the subject specified by the determination information based on the number of appearances or the appearance cumulative time is preferentially included in the virtual camera video IM.

For example, in a case where a person with a small number of appearances or a person with a short appearance cumulative time in the distribution video CT is shown in the physical camera video PP, control is performed such that the person is preferentially included in the virtual camera video IM.

As a result, for example, in a case where the distribution video CT of the event is produced, many people who participate in the event can appear in the distribution video CT. For example, it is possible to increase the possibility that not only a main character such as a bride or a bridegroom but also a friend or a relative can appear in the distribution video CT at a wedding or the like.

In the embodiment, an example has been described in which the determination information regarding the subject is the determination information indicating whether or not the subject of the physical camera video PP is the subject appearing in the distribution video CT at the current time, and the video control unit 10 performs the composition update control such that the subject other than the subject appearing in the distribution video CT at the current time is preferentially included in the virtual camera video IM.

As a result, for example, a person different from the person appearing in the current distribution video CT can appear in the next scene. Therefore, the possibility that the same person continuously appears can be reduced, and the content quality of the distribution video CT can be enhanced.

In the embodiment, an example has been described in which the determination information regarding the subject is the determination information regarding the action of the subject of the physical camera video PP, and the video control unit 10 performs composition update control such that the subject specified by the determination information regarding the action is preferentially included in the virtual camera video IM.

For example, an action of each subject is analyzed, and a person performing an important action, an action with a large movement, or the like is specified. For example, subjects attracting attention, such as speech, singing, dance, and various other performances, are preferentially included in the virtual camera video IM. As a result, the distribution video CT that does not miss the important subject can be produced.

In the embodiment, an example has been described in which the determination information regarding the subject is the determination information of the emotion of the subject of the physical camera video PP, and the video control unit 10 performs composition update control so that the subject specified by the determination information of the emotion is preferentially included in the virtual camera video.

For example, emotion estimation is performed by analyzing an expression or an action of each person who is a subject, and a person having a specific emotion is specified. Then, for example, a happy person, a crying person, or the like is preferentially included in the virtual camera video IM. As a result, the distribution video CT including the scene of the important subject can be produced.

In the embodiment, an example has been described in which the determination information regarding the subject is the determination information based on the continuous appearance time of the subject of the physical camera video PP in the distribution video CT, and the video control unit 10 performs the composition update control such that the subject specified by the determination information based on the continuous appearance time is not included in the virtual camera video.

For example, control is performed such that another person appears in the virtual camera video IM while avoiding a person who currently appears in the distribution video CT and continues to appear for a long time or a person who has continuously appeared for a long time in the past.

As a result, it is possible to avoid that the content of the distribution video CT becomes monotonous as the same person continues to appear.

In the embodiment, an example is described in which the information processing apparatus 70 functioning as the server device 1 includes the UI control unit 12 that performs UI control of displaying the physical camera video PP and the virtual camera video IM.

The UI control unit 12 performs control such that the physical camera video PP and the virtual camera video IM are displayed on the operation terminal 3. As a result, the user who produces the distribution video CT can sequentially confirm the video content.

The UI control unit 12 according to the embodiment displays a plurality of virtual camera videos IM and performs processing of detecting a user's selection operation on the displayed virtual camera videos IM.

The UI control unit 12 receives and detects a selection operation from the operation terminal 3. In response to this selection operation, one of the virtual camera videos IM is set as the distribution video CT. As a result, the user can switch the distribution video CT while confirming the plurality of virtual camera videos IM.

Since each of the plurality of virtual camera videos IM is controlled so as to change the video content according to the determination information regarding the subject, each candidate virtual camera video IM is a video that is relatively appropriate as the distribution video CT. Therefore, even if the user is a person who is not accustomed to video production, it is possible to prevent the quality of the distribution video CT from being lowered.

That is, it is possible to produce the distribution video CT with relatively high quality according to the user's easy and free selection operation.

An example has been described in which the UI control unit 12 of the embodiment performs display control to display the plurality of virtual camera videos IM and present the video currently output as the distribution video CT and the next video to be the distribution video CT in the virtual camera videos IM.

For example, the UI control unit 12 displays the video currently output as the distribution video CT on the operation terminal 3 by displaying the current frame 64 and the output video area 62 in FIG. 9. Further, by displaying next frame 65 and next video area 63, the video output as next distribution video CT is displayed on operation terminal 3. Therefore, the user can confirm the progress situation of the scene of the distribution video CT.

The user may change the virtual camera video IM displayed in the next video area 63 by performing an operation of changing the next video.

In the embodiment, an example has been described in which the information processing apparatus 70 functioning as the server device 1 includes the output control unit 11 that automatically switches the virtual camera video IM to be the distribution video CT among the plurality of virtual camera videos IM.

For example, the output control unit 11 sequentially selects a plurality of virtual camera videos IM generated by the video control unit 10 as the distribution video CT. By this automatic switching, the distribution video CT can be produced without the user performing an operation switching operation.

Since each of the plurality of virtual camera videos IM is controlled so as to change the video content according to the determination information regarding the subject and becomes a video relatively appropriate as the distribution video CT, it is possible to produce the distribution video CT with high content quality even in the automatic selection.

Furthermore, if the output control unit 11 selects the virtual camera video IM according to the progress of the scene content by the AI processing, it is possible to automatically produce the distribution video CT with higher quality.

In the embodiment, the server device 1 may be configured as a cloud server that receives a captured video (physical camera video PP) by the camera 2.

By providing the production processing of the distribution video CT of the information processing apparatus 70 of the present disclosure by the cloud computing service, the general user can easily realize the production of the distribution video CT.

Note that, in the embodiment, moving image shooting is performed by the camera 2, but the composition update control of the embodiment can also be applied to a case where still image shooting is performed by the camera 2.

In the embodiment, the physical camera video PP captured by the camera 2 is directly transmitted to the server device 1, but the camera 2 may transfer the physical camera video PP to, for example, a nearby computer device, and the computer device may transmit the physical camera video PP to the server device 1.

The program according to the embodiment is a program for causing, for example, a CPU, a DSP, an AI processor, or the like, or an information processing apparatus including the CPU, the DSP, the AI processor, or the like, to execute the processing illustrated in FIGS. 11 and 14.

That is, the program of the embodiment is a program that generates the virtual camera video IM used for the output video (for example, the distribution video CT) on the basis of the video captured by the camera 2 (the physical camera video PP) and causes the information processing apparatus to execute the composition update control of the virtual camera video IM on the basis of the determination information regarding the subject in the captured video or the output video.

With such a program, the server device 1 capable of improving the efficiency of video production can be realized in, for example, a computer device, a mobile terminal device, or other devices capable of executing information processing.

Such a program can be recorded in advance in an HDD as a recording medium built in a device such as a computer device, a ROM in a microcomputer having a CPU, or the like.

Alternatively, the program can be temporarily or permanently stored (recorded) in a removable recording medium such as a flexible disk, a compact disc read only memory (CD-ROM), a magneto optical (MO) disk, a digital versatile disc (DVD), a Blu-ray disc (registered trademark), a magnetic disk, a semiconductor memory, or a memory card. Such a removable recording medium can be provided as what is called package software.

Furthermore, such a program may be installed from the removable recording medium into a personal computer or the like, or may be downloaded from a download site via a network such as a local area network (LAN), the Internet, or the like.

In addition, such a program is suitable for a wide range of provision of the server device 1 of the embodiment. For example, by downloading the program to a mobile terminal device such as a smartphone or a tablet, an imaging device, a mobile phone, a personal computer, a still camera, a video camera, a game device, a video device, a personal digital assistant (PDA), or the like, the smartphone or the like can be caused to function as the server device 1 of the present disclosure.

Note that the effects described in the present specification are merely examples and are not limited, and other effects may be exerted.

Note that the present technology can also have the following configurations.

(1)

An information processing apparatus including a video control unit that generates a virtual camera video to be used for an output video on the basis of a captured video by a camera, and performs composition update control of the virtual camera video on the basis of determination information regarding a subject in the captured video or the output video.

(2)

The information processing apparatus according to (1), in which the video control unit executes:

generating the virtual camera video by cutting out the captured video; and performing setting control of a cutout range from the captured video as the composition update control.

(3)

The information processing apparatus according to (1) or (2), in which the video control unit executes performing control related to imaging operation of the camera as the composition update control.

(4)

The information processing apparatus according to any one of (1) to (3), in which the video control unit executes generating the virtual camera video on the basis of a plurality of the captured videos by a plurality of the cameras.

(5)

The information processing apparatus according to any one of (1) to (4), in which the video control unit executes generating a plurality of the virtual camera videos.

(6)

The information processing apparatus according to any one of (1) to (5), in which the video control unit executes performing the composition update control such that a specific subject is preferentially included in the virtual camera video.

(7)

The information processing apparatus according to (6), in which the determination information is determination information of a speaker in a subject of the captured video, and the video control unit performs the composition update control such that the speaker is preferentially included in the virtual camera video.

(8)

The information processing apparatus according to (6) or (7), in which the determination information is determination information of high importance setting for the subject of the captured video, and the video control unit performs the composition update control such that a subject for which high importance is set is preferentially included in the virtual camera video.

(9)

The information processing apparatus according to any one of (6) to (8), in which the determination information is determination information based on the number of appearances or an appearance cumulative time in the output video of each subject of the captured video, and the video control unit performs the composition update control such that a subject specified by the determination information based on the number of appearances or the appearance cumulative time is preferentially included in the virtual camera video.

(10)

The information processing apparatus according to any one of (6) to (9), in which the determination information is determination information indicating whether or not a subject of the captured video is a subject appearing in the output video at a current point of time, and the video control unit performs the composition update control such that a subject other than a subject appearing in the output video at a current point of time is preferentially included in the virtual camera video.

(11)

The information processing apparatus according to any one of (6) to (10), in which the determination information is determination information of an action of a subject of the captured video, and the video control unit performs the composition update control such that a subject specified by the determination information of the action is preferentially included in the virtual camera video.

(12)

The information processing apparatus according to any one of (6) to (11), in which the determination information is determination information of an emotion of a subject of the captured video, and the video control unit performs the composition update control such that a subject specified by the determination information of the emotion is preferentially included in the virtual camera video.

(13)

The information processing apparatus according to any one of (1) to (12), further including a user interface control unit that performs user interface control of displaying the captured video and the virtual camera video.

(14)

The information processing apparatus according to (13), in which the user interface control unit executes performing processing of displaying a plurality of the virtual camera videos and detecting a selection operation of a user for the virtual camera video displayed.

(15)

The information processing apparatus according to (13) or (14), in which the user interface control unit executes performing display control of displaying a plurality of the virtual camera videos and presenting a video which is set as a current output video and a video which is set as a next output video among the virtual camera video.

(16)

The information processing apparatus according to any one of (1) to (15), further including an output control unit that automatically switches the virtual camera video as the output video among a plurality of the virtual camera videos.

(17)

The information processing apparatus according to any one of (1) to (16), the information processing apparatus being configured as a cloud server that receives the captured video by the camera.

(18)

An information processing method in which an information processing apparatus executes generating a virtual camera video to be used for an output video on the basis of a captured video by a camera, and performing composition update control of the virtual camera video on the basis of determination information regarding a subject in the captured video or the output video.

(19)

A program for causing an information processing apparatus to execute generating a virtual camera video to be used for an output video on the basis of a captured video by a camera, and performing composition update control of the virtual camera video on the basis of determination information regarding a subject in the captured video or the output video (20)

An information processing system including:

one or a plurality of cameras; and an information processing apparatus including a video control unit that generates a virtual camera video to be used for an output video on the basis of a captured video by the camera, and performs composition update control of the virtual camera video on the basis of determination information regarding a subject in the captured video or the output video.

REFERENCE SIGNS LIST

1 Server device
2, 2A, 2B, 2C Camera
3 Operation terminal
4 Network
5 Distribution destination terminal
10 Video control unit
11 Output control unit
12 UI control unit
50, 50A, 50B, 50C, 50D Virtual camera
60 Physical camera video area
61 Virtual camera video area
62 Output video area
63 Next video area
64 Current frame
65 Next frame
66 Parameter area
70 Information processing apparatus
71 CPU
85 AI processor

The invention claimed is:

1. An information processing apparatus comprising:

a memory storing a program, and at least one processor configured to execute the program to perform operations comprising:

generating a virtual camera video to be used for an output video on a basis of a captured video by a camera;

performing composition update control of the virtual camera video on a basis of determination information regarding a subject in the captured video or the output video;

generating the virtual camera video by cutting out the captured video; and performing setting control of a cutout range from the captured video as the composition update control.

2. The information processing apparatus according to claim 1, wherein the operations further comprise"

performing control related to imaging operation of the camera as the composition update control.

3. The information processing apparatus according to claim 1, wherein the operations further comprise:

generating the virtual camera video on a basis of a plurality of the captured videos by a plurality of the cameras.

4. The information processing apparatus according to claim 1, wherein the operations further comprise:

generating a plurality of the virtual camera videos.

5. The information processing apparatus according to claim 1, wherein the operations further comprise:

performing the composition update control such that a specific subject is preferentially included in the virtual camera video.

6. The information processing apparatus according to claim 1, wherein the operations further comprise:

performing user interface control of displaying the captured video and the virtual camera video.

7. The information processing apparatus according to claim 1, wherein the operations further comprise:

automatically switching the virtual camera video as the output video among a plurality of the virtual camera videos.

8. The information processing apparatus according to claim 1, the information processing apparatus being configured as a cloud server that receives the captured video by the camera.

9. An information processing apparatus comprising:

a memory storing a program, and at least one processor configured to execute the program to perform operations comprising:

generating a virtual camera video to be used for an output video on a basis of a captured video by a camera;

performing composition update control of the virtual camera video on a basis of determination information regarding a subject in the captured video or the output video;

performing the composition update control such that a specific subject is preferentially included in the virtual camera video, wherein the determination information is determination information of a speaker in a subject of the captured video; and performing the composition update control such that the speaker is preferentially included in the virtual camera video.

10. An information processing apparatus comprising:

a memory storing a program, and at least one processor configured to execute the program to perform operations comprising:

generating a virtual camera video to be used for an output video on a basis of a captured video by a camera;

performing composition update control of the virtual camera video on a basis of determination information regarding a subject in the captured video or the output video;

performing the composition update control such that a specific subject is preferentially included in the virtual camera video, wherein the determination information is determination information of high importance setting for the subject of the captured video; and performing the composition update control such that a subject for which high importance is set is preferentially included in the virtual camera video.

11. An information processing apparatus comprising:

a memory storing a program, and at least one processor configured to execute the program to perform operations comprising:

generating a virtual camera video to be used for an output video on a basis of a captured video by a camera;

performing composition update control of the virtual camera video on a basis of determination information regarding a subject in the captured video or the output video;

performing the composition update control such that a specific subject is preferentially included in the virtual camera video, wherein the determination information is determination information based on a number of appearances or an appearance cumulative time in the output video of a subject of the captured video; and performing the composition update control such that a subject specified by the determination information based on the number of appearances or the appearance cumulative time is preferentially included in the virtual camera video.

12. An information processing apparatus comprising:

a memory storing a program, and at least one processor configured to execute the program to perform operations comprising:

generating a virtual camera video to be used for an output video on a basis of a captured video by a camera;

performing composition update control of the virtual camera video on a basis of determination information regarding a subject in the captured video or the output video;

performing the composition update control such that a specific subject is preferentially included in the virtual camera video, wherein the determination information is determination information indicating whether or not a subject of the captured video is a subject appearing in the output video at a current point of time; and performing the composition update control such that a subject other than a subject appearing in the output video at a current point of time is preferentially included in the virtual camera video.

13. An information processing apparatus comprising:

a memory storing a program, and at least one processor configured to execute the program to perform operations comprising:

generating a virtual camera video to be used for an output video on a basis of a captured video by a camera;

performing composition update control of the virtual camera video on a basis of determination information regarding a subject in the captured video or the output video;

performing the composition update control such that a specific subject is preferentially included in the virtual camera video, wherein the determination information is determination information of an action of a subject of the captured video; and performing the composition update control such that a subject specified by the determination information of the action is preferentially included in the virtual camera video.

14. An information processing apparatus comprising:

a memory storing a program, and at least one processor configured to execute the program to perform operations comprising:

generating a virtual camera video to be used for an output video on a basis of a captured video by a camera;

performing composition update control of the virtual camera video on a basis of determination information regarding a subject in the captured video or the output video;

performing the composition update control such that a specific subject is preferentially included in the virtual camera video, wherein the determination information is determination information of an emotion of a subject of the captured video; and performing the composition update control such that a subject specified by the determination information of the emotion is preferentially included in the virtual camera video.

15. An information processing apparatus comprising:

a memory storing a program, and at least one processor configured to execute the program to perform operations comprising:

generating a virtual camera video to be used for an output video on a basis of a captured video by a camera;

performing composition update control of the virtual camera video on a basis of determination information regarding a subject in the captured video or the output video;

performing user interface control of displaying the captured video and the virtual camera video by performing processing of displaying a plurality of the virtual camera videos and detecting a selection operation of a user for the virtual camera video displayed.

16. An information processing apparatus comprising:

a memory storing a program, and at least one processor configured to execute the program to perform operations comprising:

generating a virtual camera video to be used for an output video on a basis of a captured video by a camera;

performing composition update control of the virtual camera video on a basis of determination information regarding a subject in the captured video or the output video;

performing user interface control of displaying the captured video and the virtual camera video by performing display control of displaying a plurality of the virtual camera videos and presenting a video which is set as a current output video and a video which is set as a next output video among the virtual camera videos.

* * * * *